US012787035B2

(12) United States Patent
You et al.

(10) Patent No.: US 12,787,035 B2
(45) Date of Patent: Nov. 3, 2026

(54) OPERATING METHOD OF APPARATUS IN WIRELESS COMMUNICATION SYSTEM, AND APPARATUS USING SAME METHOD

(71) Applicant: LG ELECTRONICS INC., Seoul (KR)

(72) Inventors: Hyangsun You, Seoul (KR); Hyunsoo Ko, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 229 days.

(21) Appl. No.: 18/846,853

(22) PCT Filed: Mar. 27, 2023

(86) PCT No.: PCT/KR2023/004006
§ 371 (c)(1),
(2) Date: Sep. 13, 2024

(87) PCT Pub. No.: WO2023/191406
PCT Pub. Date: Oct. 5, 2023

(65) Prior Publication Data

US 2025/0227721 A1 Jul. 10, 2025

(30) Foreign Application Priority Data

Mar. 29, 2022 (KR) ........................ 10-2022-0038961
Apr. 13, 2022 (KR) ........................ 10-2022-0045608
Aug. 11, 2022 (KR) ........................ 10-2022-0100787

(51) Int. Cl.
*H04W 72/25* (2023.01)
*H04W 72/0453* (2023.01)
*H04W 88/04* (2009.01)

(52) U.S. Cl.
CPC ....... *H04W 72/25* (2023.01); *H04W 72/0453* (2013.01); *H04W 88/04* (2013.01)

(58) Field of Classification Search
CPC . H04W 72/25; H04W 72/0453; H04W 88/04; H04W 52/46; H04W 84/047;
(Continued)

(56) References Cited

U.S. PATENT DOCUMENTS

2020/0029317 A1* 1/2020 Nam ..................... H04L 5/0098
2020/0403689 A1 12/2020 Rofougaran et al.
(Continued)

FOREIGN PATENT DOCUMENTS

EP 4503494 A1 2/2025

OTHER PUBLICATIONS

Huawei, HiSilicon "Views on smart repeaters," 3GPP TSG RAN Meeting #93-e, RP-212505, 5 pages, Sep. 2021.
(Continued)

*Primary Examiner* — Marnie A Matt
(74) *Attorney, Agent, or Firm* — BRYAN CAVE LEIGHTON PAISNER LLP

(57) ABSTRACT

Provided are an operating method of NCR and an apparatus, in a wireless communication system. The NCR performs an initial access procedure with a network, receives side control information from the network, and performs a forwarding operation in at least one of a first frequency band and a second frequency band, on the basis of the side control information. Here, the side control information is independently configured for each of the first frequency band and the second frequency band.

20 Claims, 24 Drawing Sheets

(58) Field of Classification Search
CPC ............... H04W 72/20; H04B 7/15542; H04B 7/06952; H04B 7/155; H04B 7/15528; H04L 5/0053; H04L 5/0091; H04L 5/1469
USPC .......................................................... 370/315
See application file for complete search history.

(56) References Cited

U.S. PATENT DOCUMENTS

| | | | | |
|---|---|---|---|---|
| 2021/0036764 | A1* | 2/2021 | Li | H04B 7/088 |
| 2021/0298069 | A1* | 9/2021 | Abedini | H04B 7/15528 |
| 2022/0053486 | A1* | 2/2022 | Abedini | H04B 7/0696 |
| 2024/0171269 | A1* | 5/2024 | Xu | H04B 7/22 |
| 2024/0365425 | A1* | 10/2024 | Yi | H04B 7/15528 |
| 2025/0212264 | A1* | 6/2025 | You | H04W 72/23 |

OTHER PUBLICATIONS

CMCC "Discussion on smart repeater," 3GPP TSG RAN Meeting #94-e, RP-213044, 6 pages, Dec. 2021.
Nokia, Nokia Shanghai Bell, "On Repeaters in Rel-18," 3GPP TSG RAN Meeting #94e, RP-213422, 5 pages Dec. 2021.
ZTE Corporation "New SI: Study on NR Network-controlled Repeaters," 3GPP TSG RAN Meeting #94e, RP-213700, 6 pages, Dec. 2021.
Nokia (2021), "Multi-band operation of NR repeaters," 3GPP TSG-RAN WG4, Meeting #100-e, Electronic meeting, R4-2113665, Aug. 16-27, 2021, 3 pages.
Samsung (2021), "Moderator's summary for discussion on [RAN94e-R18Prep-03] Additional topological improvements—smart repeater," 3GPP TSG RAN, Meeting #94-e RP-212663, Electronic meeting, Dec. 6-17, 2021, pp. 1-61.
Qualcomm (2020), "Views on multi-cell PDSCH scheduling via a single DCI," 3GPP TSG-RAN WG1 #102-e, e-Meeting, R1-2006834, Aug. 17-28, 2020, 5 pages.

* cited by examiner

OPERATING METHOD OF APPARATUS IN WIRELESS COMMUNICATION SYSTEM, AND APPARATUS USING SAME METHOD

CROSS-REFERENCE TO RELATED APPLICATIONS

This application is the National Stage filing under 35 U.S.C. 371 of International Application No. PCT/KR2023/004006, filed on Mar. 27, 2023, which claims the benefit of Korean Patent Application No. 10-2022-0038961 filed on Mar. 29, 2022, Korean Patent Application No. 10-2022-0045608 filed on Apr. 13, 2022, Korean Patent Application No. 10-2022-0100787 filed on Aug. 11, 2022, which are all hereby incorporated by reference herein in their entirety.

TECHNICAL FIELD

This disclosure relates to a method of operating a device in a wireless communication system and a device using the method.

BACKGROUND

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/user equipment (UE) is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

Meanwhile, in a conventional repeater, the frequency band/resource over which forwarding is performed is fixed. Then, for example, the repeater performs forwarding in the entire forwarding frequency band, even if the user equipment (UE) actually transmits the signal in only some frequency resources. Therefore, the repeater consumes unnecessary power and may cause a lot of interference to neighboring UEs/base stations.

To solve these problems, in NR, a network-controlled repeater (NCR) may be introduced. The NCR can receive side control information from the network to adjust beam direction, ON/OFF operation, etc.

If the NCR is performing forwarding operations in a multicarrier environment, it is necessary to apply different beam directions for each carrier/frequency resource in the multicarrier, and the presence of signals to be forwarded on each carrier/frequency resource may also vary.

In a multi-carrier environment, applying common side control information for the entire frequency resource can make effective multiplexing operation difficult and cause unnecessary interference to neighboring UEs/base stations.

SUMMARY

The technical problem that the present disclosure aims to solve is to provide a method of operating a device in a wireless communication system and a device that uses the method.

In a wireless communication system, a method of operating a device and an apparatus comprising a network-controlled repeater (NCR)-mobile termination (MT) and a NCR-forwarding (Fwd) are provided. According to the method, the NCR performs an initial access procedure with a network, receives side control information from the network, and performs a forwarding operation in at least one of a plurality of frequency bands based on the side control information. In this case, the side control information is set independently for each of the plurality of frequency bands.

The NCR according to the present disclosure may also operate in a multi-carrier environment.

Since the NCR receives independent side control information for each frequency band/carrier/resource for which forwarding is performed, different forwarding operation can be performed for each frequency band/carrier/resource. This reduces unnecessary power consumption and reduces interference to neighboring UEs/base stations.

In addition, the relationship between the reception of side control information and the application of side control information in a multi-carrier environment can be clarified to avoid ambiguity between the base station and the NCR and between the NCR and the UE.

DETAILED DESCRIPTION

Figure 1:
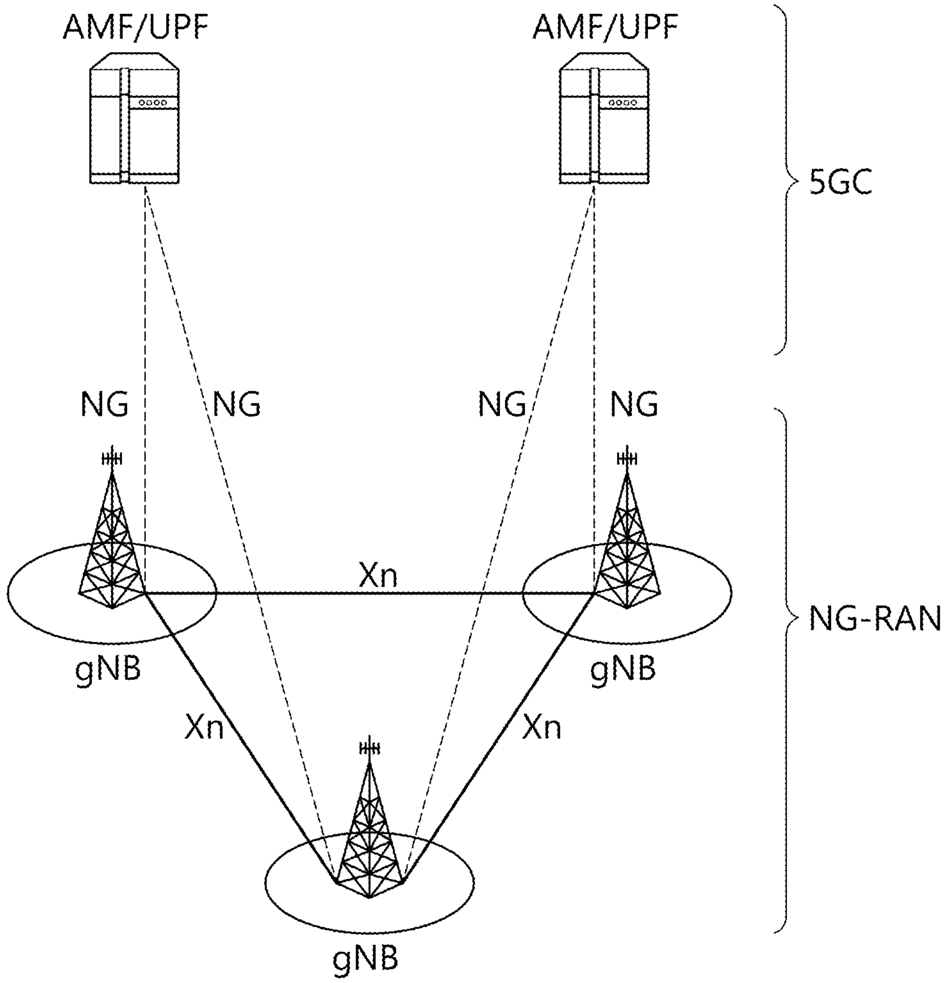
FIG. 1 illustrates the system structure of a next-generation radio access network (NG-RAN) to which NR is applied.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

A wireless communication system to which the present disclosure can be applied may be called, for example, E-UTRAN (Evolved-UMTS Terrestrial Radio Access Network), or LTE (Long Term Evolution)/LTE-A system.

The E-UTRAN includes a base station (BS) which provides a control plane and a user plane to a user equipment (UE). The UE may be fixed or mobile, and may be referred to as another terminology, such as a mobile station (MS), a user terminal (UT), a subscriber station (SS), a mobile terminal (MT), a wireless device, terminal etc. The BS is generally a fixed station that communicates with the UE and may be referred to as another terminology, such as an evolved node-B (eNB), a base transceiver system (BTS), an access point, etc.

The BSs are interconnected by means of an X2 interface. The BSs are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

As more and more communication devices require greater communication capacity, there is a need for improved mobile broadband communications over traditional radio access technology (RAT). Massive MTC (massive Machine Type Communications), which connects multiple devices and objects to provide various services anytime, anywhere, is also one of the major issues to be considered in next-generation communications. In addition, the design of communication systems considering reliability and latency-sensitive services/UEs is being discussed. As such, the introduction of next-generation radio access technologies that take into account enhanced mobile broadband communication, massive MTC, ultra-reliable and low latency communication (URLLC), etc. is being discussed, and the technology is referred to herein as new radio access technology (new RAT, NR) for convenience.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a UE. FIG. 1 illustrates the case of including only gNBs. The gNBs (eNBs) are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Meanwhile, layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
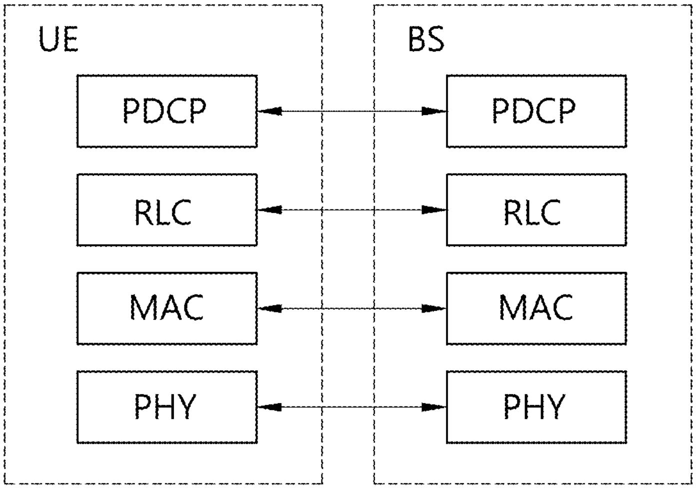
FIG. 2 is a block diagram showing the radio protocol architecture for the user plane.
Figure 3:
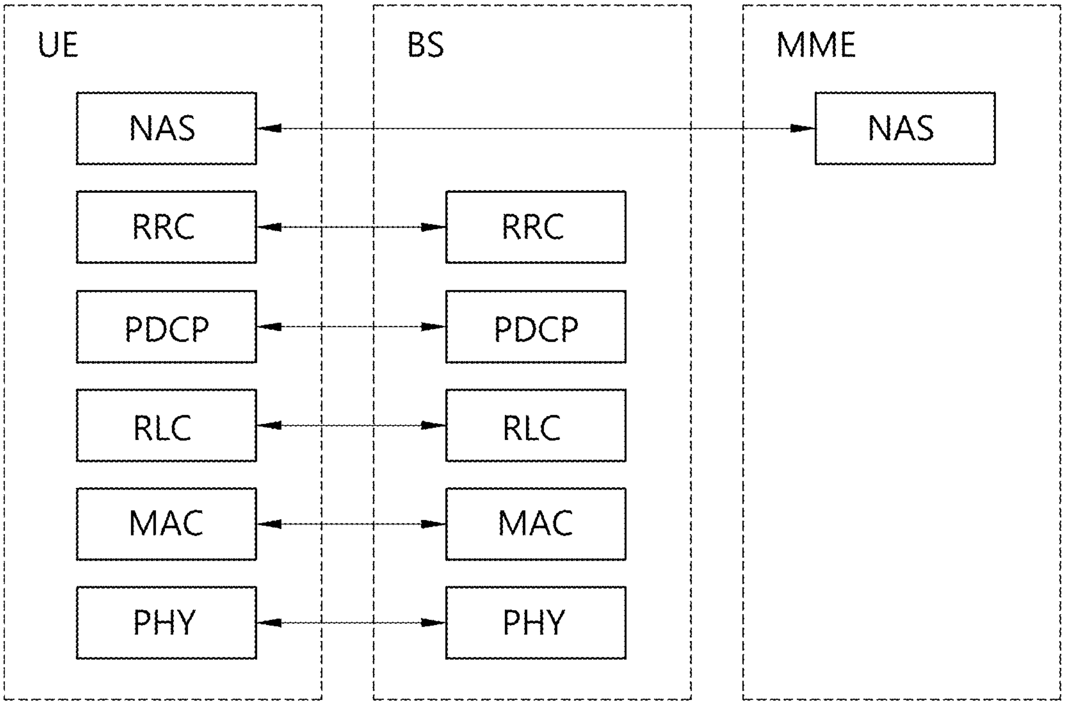
FIG. 3 is a block diagram showing the radio protocol structure for the control plane.

FIG. 2 is a block diagram showing the radio protocol architecture for the user plane. FIG. 3 is a block diagram showing the radio protocol structure for the control plane. The user plane is a protocol stack for user data transmission. The control plane is a protocol stack for control signal transmission.

Referring to FIG. 2 and FIG. 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QOS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
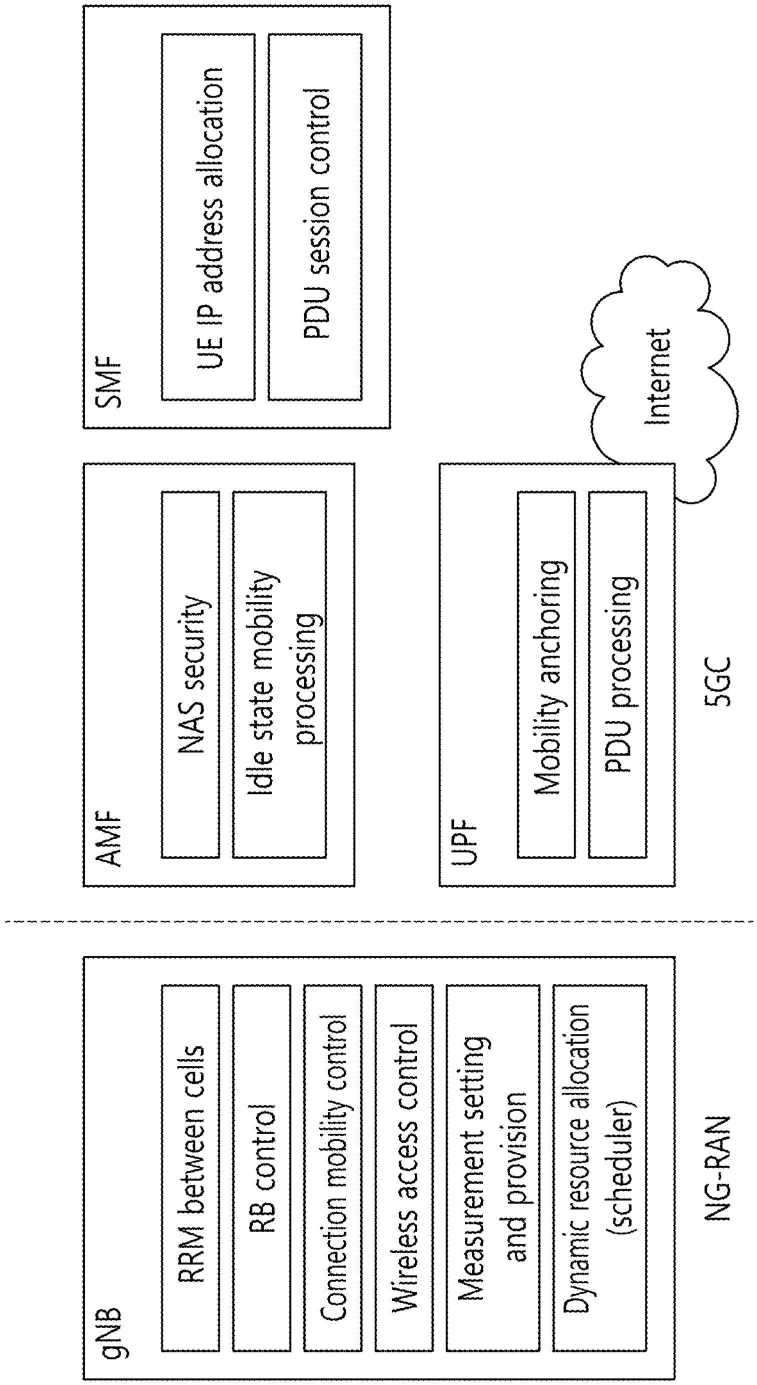
FIG. 4 illustrates the functional division between NG-RAN and 5GC.

FIG. 4 illustrates a functional division between an NG-RAN and a 5GC.

Referring to FIG. 4, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 5:
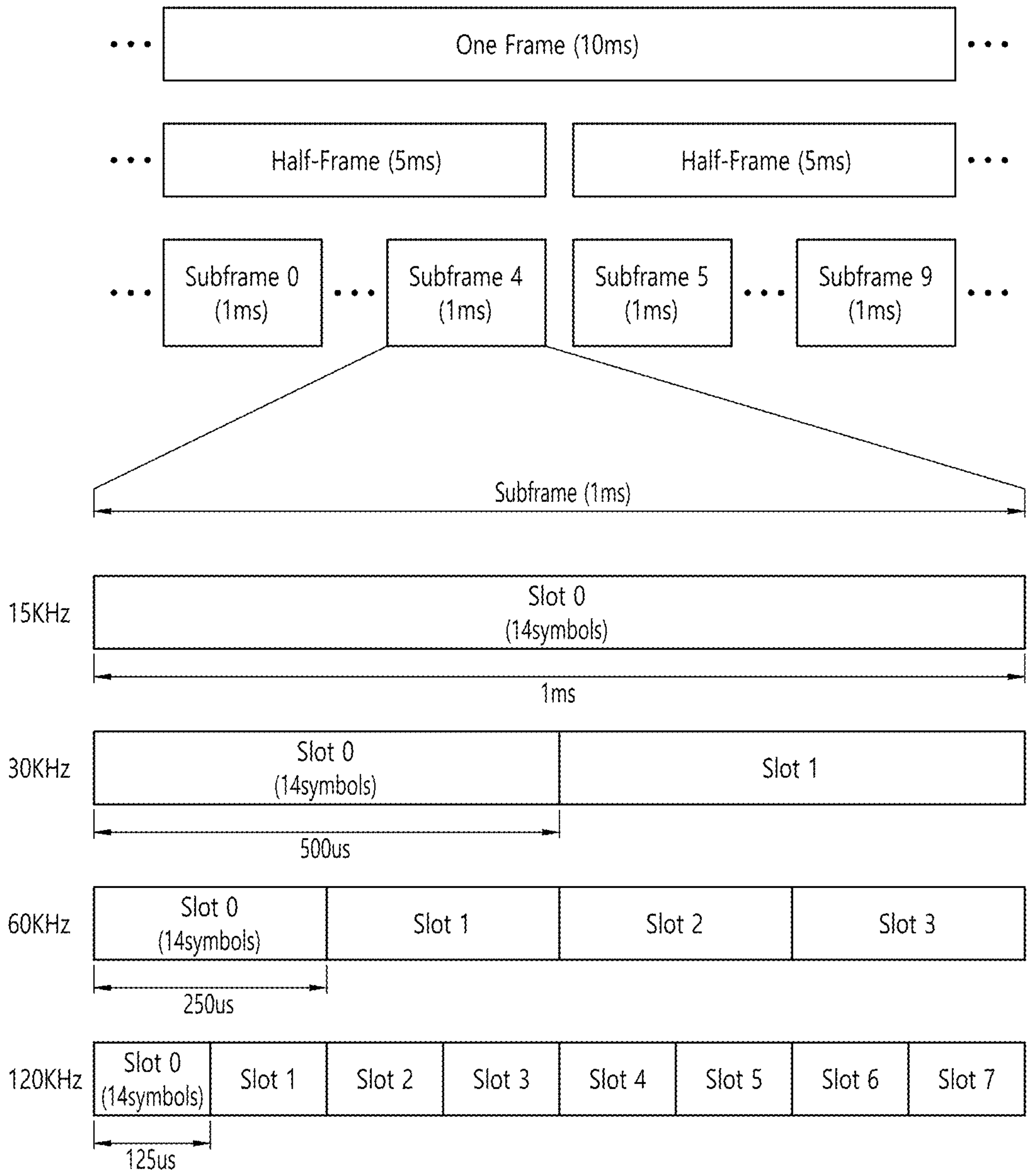
FIG. 5 illustrates a frame structure that can be applied in NR.

FIG. 5 illustrates an example of a frame structure that may be applied in NR.

Referring to FIG. 5, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM (A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration μ.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 5 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| SCS ($15 \cdot 2^{\mu}$) | $N^{slot}_{symb}$ | $N^{frame,\mu}_{slot}$ | $N^{subframe,\mu}_{slot}$ |
|---|---|---|---|
| 60 kHz ($\mu$ = 2) | 12 | 40 | 4 |

In an NR system, OFDM (A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 6:
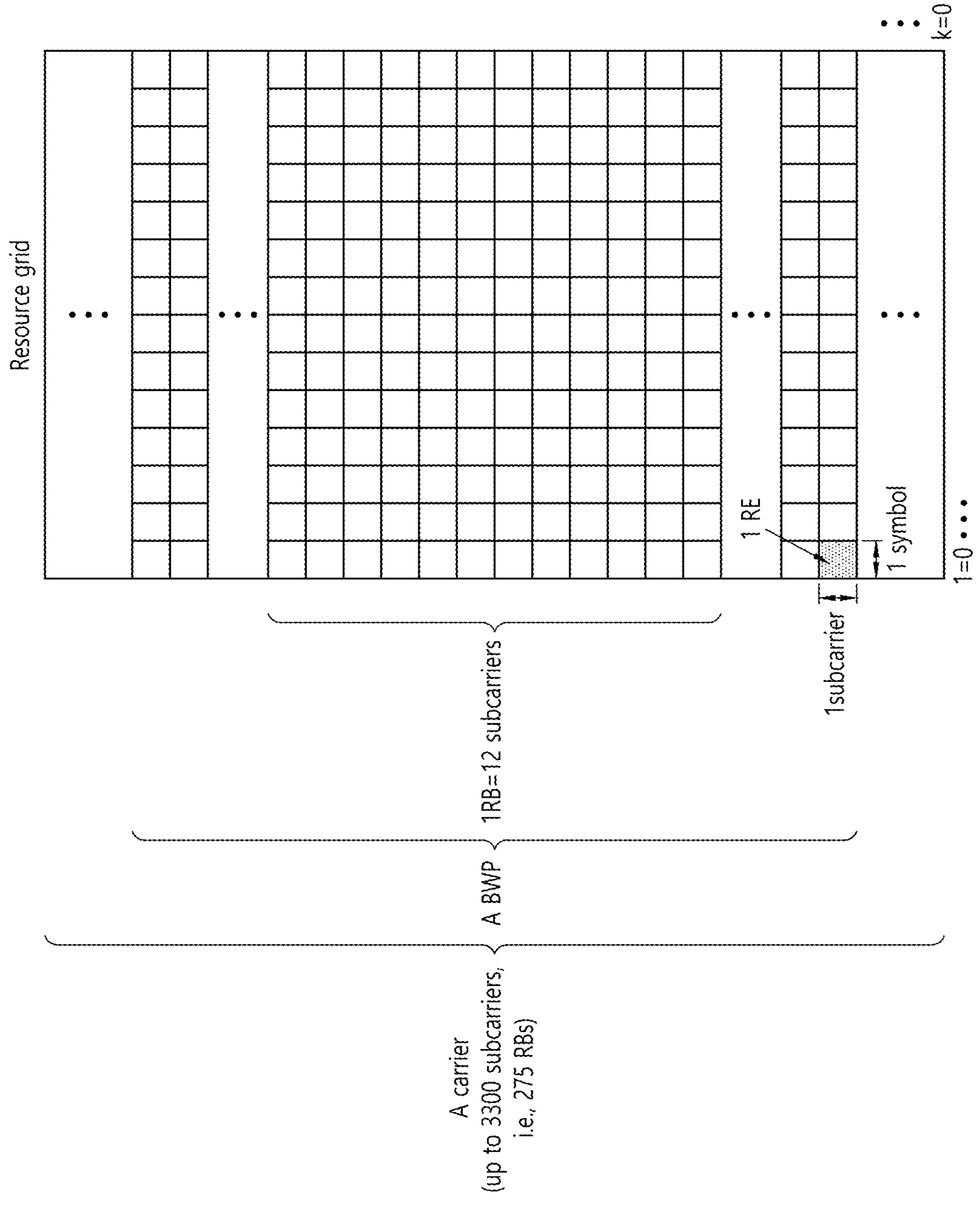
FIG. 6 illustrates the slot structure of an NR frame.

FIG. 6 illustrates a slot structure.

A slot may include a plurality of symbols in a time domain. For example, in case of a normal CP, one slot may include 14 symbols (or 7 symbols). However, in case of an extended CP, one slot may include 12 symbols (or 6 symbols). A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of contiguous (physical) resource blocks ((P)RBs) in the frequency domain, and the BWP may correspond to one numerology (e.g., SCS, CP length, and so on). The carrier may include up to N (e.g., 5) BWPs. Data communication may be performed via an active BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 7:
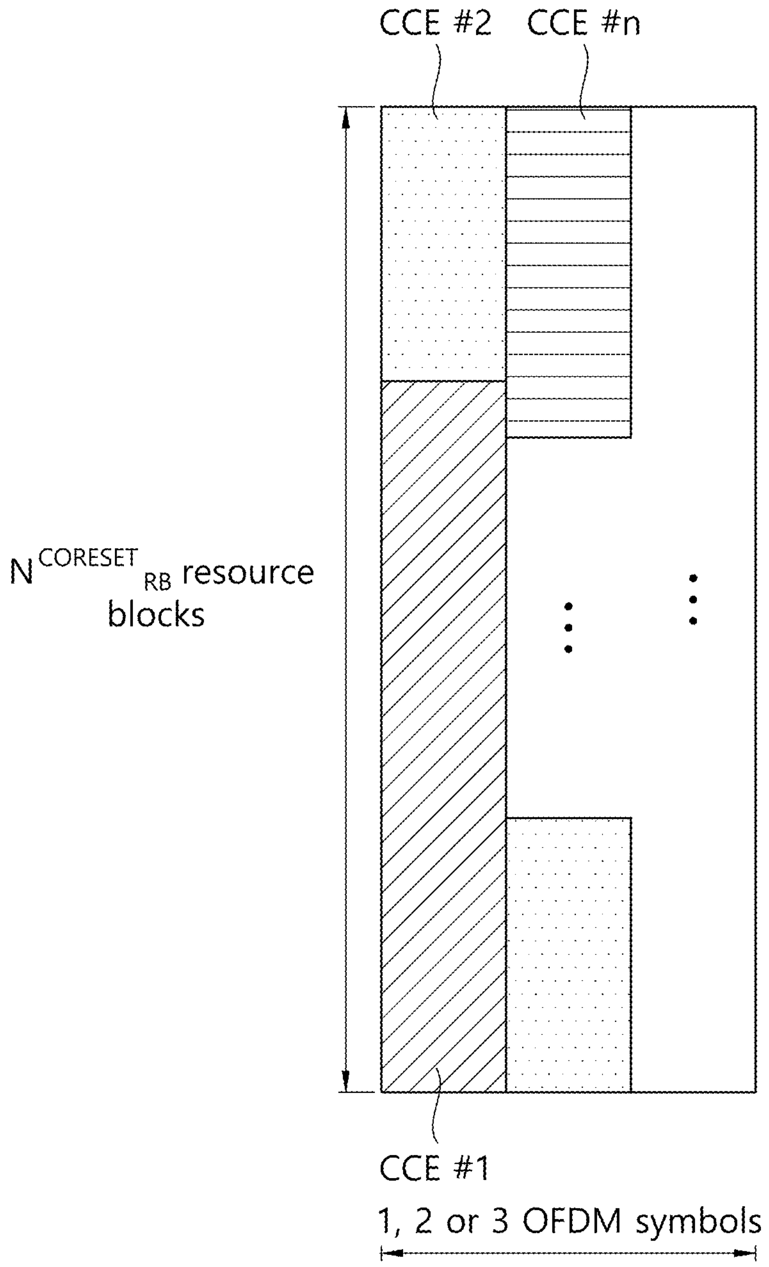
FIG. 7 illustrates the CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESET is radio resources for control information to be received by the UE and may use only a portion, rather than the entirety of the system bandwidth. The BS may allocate the CORESET to each UE and may transmit control information through the allocated CORESET. In the NR, the UE may receive control information from the BS, without necessarily receiving the entire system band.

The CORESET may include a UE-specific CORESET for transmitting UE-specific control information and a common CORESET for transmitting control information common to all UEs.

On the other hand, NR may require high reliability depending on the application field. In this situation, the target block error rate (BLER) for downlink control information (DCI) transmitted through a downlink control channel (e.g., physical downlink control channel: PDCCH) may be significantly lower than that of the prior art. As an example of a method to satisfy the requirement for such high reliability, the amount of content included in DCI can be reduced and/or the amount of resources used when transmitting DCI can be increased. At this time, the resources may include at least one of resources in the time domain, resources in the frequency domain, resources in the code domain, and resources in the spatial domain.

In NR, the following technologies/features can be applied.

<Self-Contained Subframe Structure>

Figure 8:
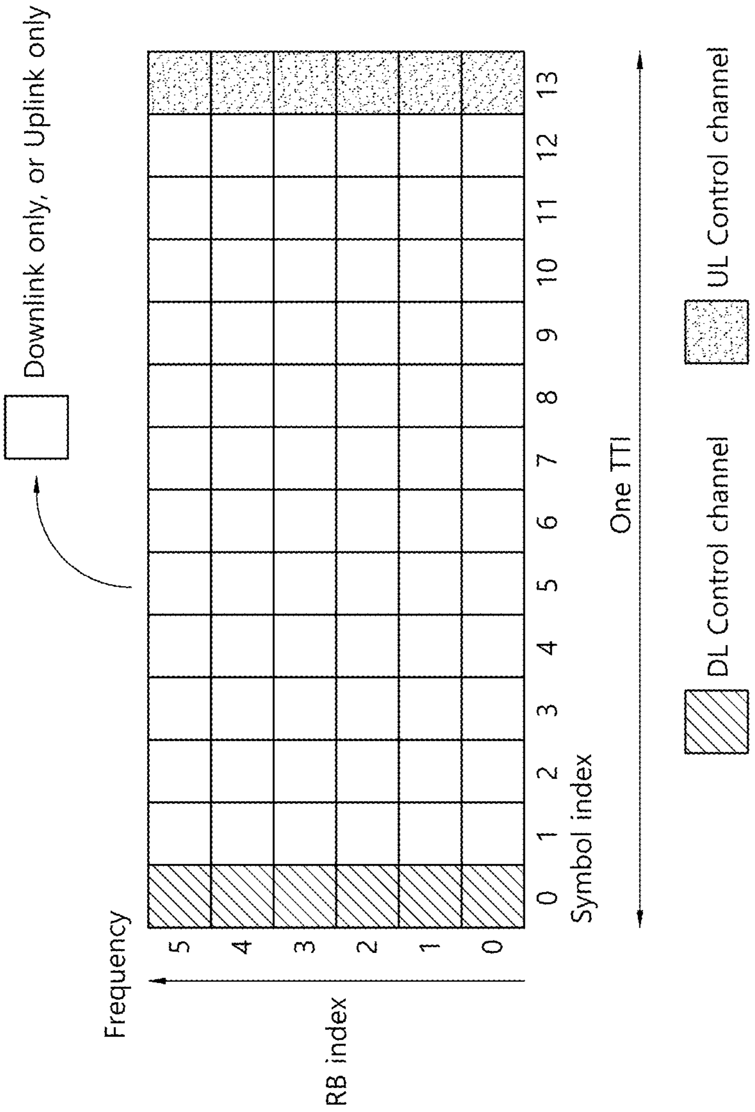
FIG. 8 shows an example of a frame structure for a new wireless access technology.

FIG. 8 shows an example of a frame structure for a new wireless access technology.

In NR, as shown in FIG. 8, a structure in which a control channel and a data channel are time-division-multiplexed within one TTI can be considered as a frame structure in order to minimize latency.

In FIG. 8, the hatched area represents the downlink control area, and the black portion represents the uplink control area. An unmarked area may be used for transmitting downlink data (DL data) or may be used for transmitting uplink data (UL data). The characteristic of this structure is that downlink (DL) transmission and uplink (UL) transmission proceed sequentially within one subframe, DL data can be transmitted within a subframe and UL ACK/NACK (Acknowledgement/Not-acknowledgement) can also be received. As a result, the time it takes to retransmit data when a data transmission error occurs is reduced, thereby minimizing the latency of final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 9:
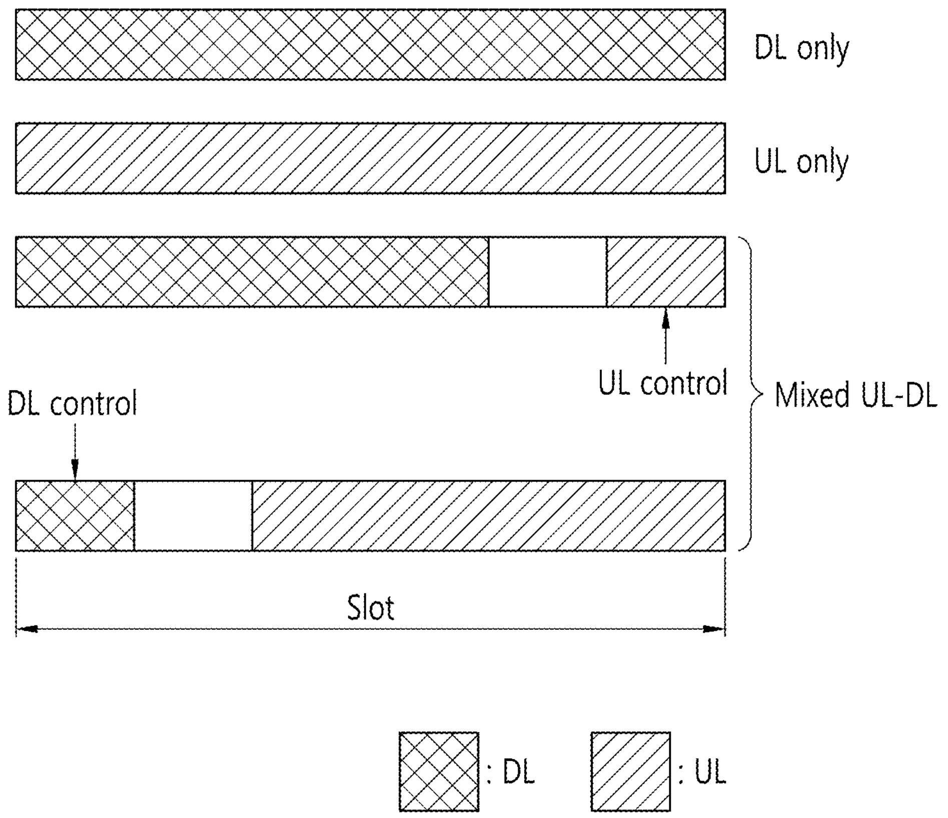
FIG. 9 illustrates the structure of a self-contained slot.

FIG. 9 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration,
2. UL only configuration,
3. Mixed UL-DL configuration:

DL region+Guard period (GP)+UL control region,

DL control region+GP+UL region.

DL region: (i) DL data region, (ii) DL control region+DL data region.

UL region: (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH related with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process related with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell),
2) PDCCH DM-RS scrambling sequence initialization value,
3) Duration of a CORESET in the time domain (which may be given in symbol units),
4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
|---|---|
| QCL-TypeA | Doppler shift, Doppler spread, Average delay, Delay spread |
| QCL-TypeB | Doppler shift, Doppler spread |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 10:
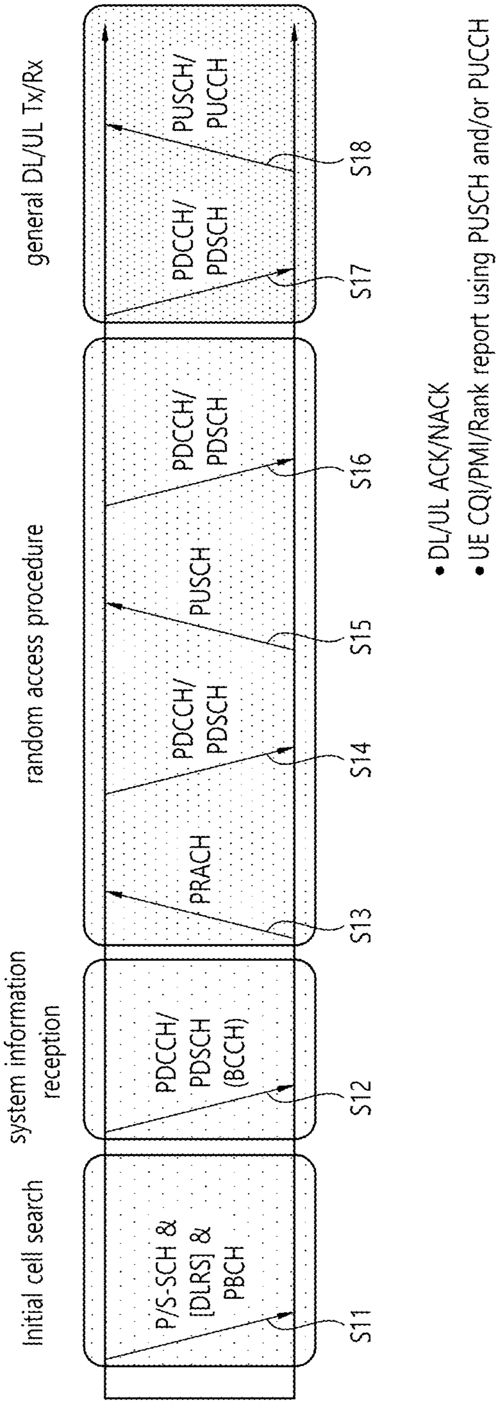
FIG. 10 illustrates physical channels and typical signal transmission.

FIG. 10 illustrates physical channels and typical signal transmission.

Referring to FIG. 10, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

(Initial) cell search can be said to be a procedure in which the UE obtains time and frequency synchronization with a cell and detects the cell ID of the cell. Cell search may be based on the cell's primary synchronization signal and secondary synchronization signal, and PBCH DMRS.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (this can be said to be the process of receiving a competition resolution message) (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP (bandwidth part) and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

This disclosure defines the following.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

When relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features described individually in one drawing in this specification may be implemented individually or simultaneously.

The following drawings were prepared to explain a specific example of the present specification. Since the names of specific devices or specific signals/messages/fields described in the drawings are provided as examples, the technical features of this specification are not limited to the specific names used in the drawings below.

Hereinafter, the present disclosure will be described.

The present disclosure proposes a method for determining an operating frequency resource of a mobile termination (MT) and a remote unit (RU) of a network-controlled repeater (NCR) in the operation of the NCR in an NR environment. Hereinafter, the relay may also be referred to as a repeater. Hereafter, MT may be referred to as NCR-MT, RU may be referred to as NCR-Fwd (forwarding).

<Transport Network Architecture for 5G>

Figure 11:
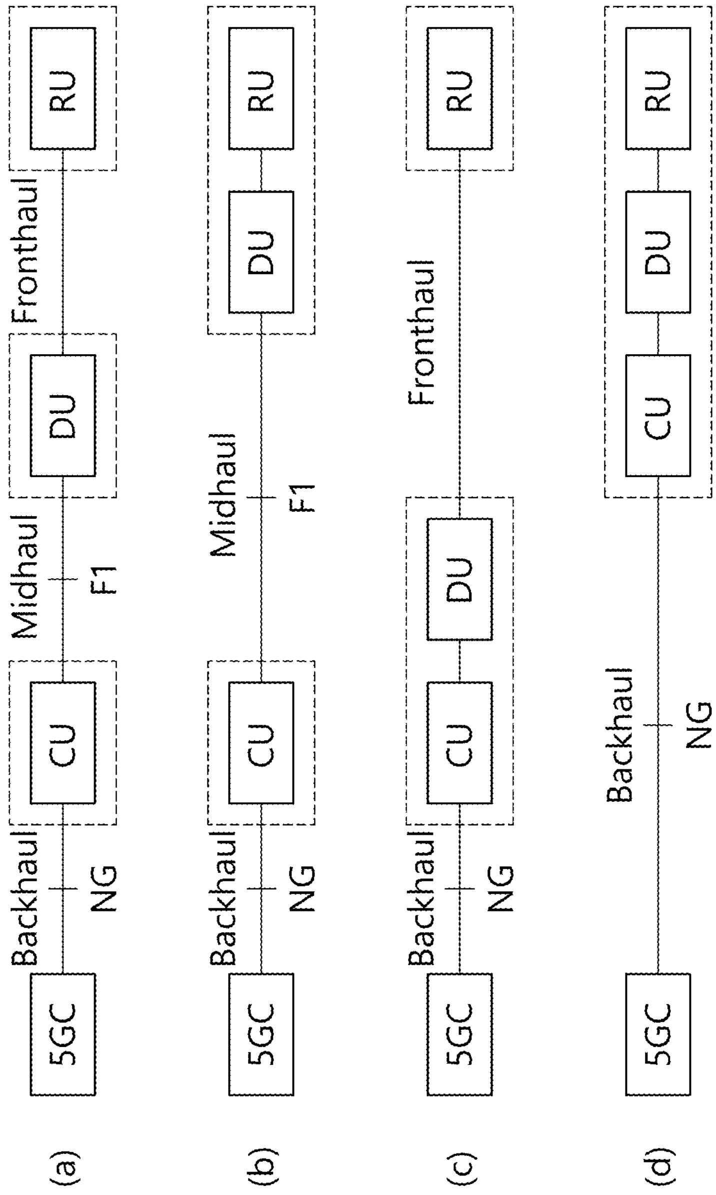
FIG. 11 illustrates possible transport network architectures for 5G.

FIG. 11 illustrates transport network architectures for 5G.

The Telecommunication Standardization Sector (ITU-T) has adopted a transport network architecture for 5G that consists of three logical elements: Centralized Unit (CU), Distributed Unit (DU), and Remote Unit (RU), as shown in (a) of FIG. 11.

In this model, mid- and lower-layer functions are divided between DU and RU. RU implement RF functions and, depending on the functional split between RU and DU, also implement low-PHY and high-PHY functions, if possible. Depending on the network requirements, CU, DU, and RU may be grouped into different combinations to form the actual physical network elements.

For example, CU, DU, and RU may be grouped in various combinations, as shown in (b) to (d) of FIG. 11. This can provide flexibility to accommodate different network architectures, applications, and transport network requirements.

As shown in FIG. 11, the transport network between the 5GC and the CU is called backhaul. The backhaul network implements the 3GPP NG interface. Similarly, the transport network between the CU and the DU is called midhaul. The midhaul network implements the 3GPP F1 interface. Finally, the transport network between the DU and the RU is called fronthaul. Backhaul, midhaul, and fronthaul can be collectively referred to as xhaul.

Reconfigurable intelligent surfaces (RIS), also known as intelligent reflecting surfaces (IRS) and large intelligent surfaces (LIS), are programmable structures that can be used to control the propagation of electromagnetic waves (EM) by changing the electrical and magnetic properties of the surface.

In addition to electromagnetic control, RIS can be used to sense the wireless environment by incorporating sensing capabilities. By placing an RIS in an environment where wireless systems operate, it is possible to control at least partially the properties of the wireless channel.

The unique capabilities of RIS can provide a number of benefits, including the potential to improve reliability and coverage performance through beamforming or range extension. The ability to control the propagation environment is somewhat shifting the traditional wireless system design paradigm, where the radio channel is often viewed as an uncontrollable entity that distorts the transmitted signal. Traditionally, transmitters (TX) and receivers (RX) are designed to evenly distribute the effects of the channel. There are many scenarios that can be imagined, from placing a single RIS on a wall to sending signals coming from a predetermined direction.

RIS can be used to improve coverage in shaded areas by providing the 'penetration effect' of base station signals from outside into the building, and the 'reflection effect' of a non-line-of-sight environment.

<Network-Controlled Repeater in NR>

(1) Conventional RF Repeater

A (conventional) RF repeater is a non-regenerative type of relay node that simply amplifies and forwards whatever it receives. The main advantages of RF repeaters are their low cost, ease of deployment, and the fact that they do not add latency. Their main disadvantage is that they amplify signals and noise, which can contribute to increased interference (contamination) in the system.

(2) Rel-17 WI on RF Repeater (RAN4)

RF repeaters are specified in Rel-17 of RAN4 for the FR1 band FDD/TDD and FR2 band. The Rel-17 Work Item Description (WID) contains only RF requirements. One of the RAN4 WIDs states that 'it is assumed that the repeater does not perform adaptive beamforming towards the UE'.

(3) Rel-18 Network Controlled Repeater for NR

Coverage is a fundamental aspect of cellular network deployment. Mobile operators rely on different types of network nodes to provide comprehensive coverage. Deploying regular full-stack cells is one option, but it may not always be possible (e.g., if there is no backhaul availability) or economically viable.

As a result, new types of network nodes were considered to give mobile operators more flexibility in network deployment. For example, Integrated Access and Backhaul (IAB) is a new type of network node that does not require wired backhaul and was introduced in Rel-16 and improved in Rel-17. Another type of network node is an RF repeater, which simply amplifies and forwards all signals it receives. RF repeaters were widely deployed in 2G, 3G, and 4G to supplement the coverage provided by regular full-stack cells.

RF repeaters provide a cost-effective means of extending network coverage, but they have limitations. RF repeaters simply perform amplification and forwarding tasks without considering the various factors that can improve performance. These factors can include semi-static and/or dynamic downlink/uplink configurations, adaptive transmitter/receiver spatial beamforming, information for ON-OFF states, and more.

A network controlled repeater (NCR) has an improved function for receiving and processing side control information from the network compared to existing RF repeaters. Side control information enables the network controlled repeater to perform amplification and forwarding tasks in a more efficient manner. Potential benefits include mitigation of unnecessary noise amplification, better spatially directed transmission and reception, and simplified network integration.

Research on network controlled repeaters (NCRs) can focus on the following scenarios and assumptions.

Network controlled repeaters are in-band RF repeaters used to extend network coverage in the FR1 and FR2 bands, and FR2 deployment can be prioritized for both outdoor and O2I scenarios.

The network controlled repeater can be transparent to the UE.

The network controlled repeater can simultaneously maintain a base station-to-repeater link and a repeater-to-UE link.

Cost-effectiveness is a key consideration for network controlled repeaters.

The side control information below needs to be studied and identified.

Beamforming information, timing information to align the transmit and receive boundaries of network controlled repeaters, UL-DL TDD configurations information, ON-OFF information for efficient interference management and energy efficiency, and power control information for efficient interference management.

Research and identification of L1/L2 signals (including their configurations) to convey side control information may be required. In terms of the management of network controlled repeaters, it is necessary to study the identification and authentication of network controlled repeaters.

NCR can be considered to be composed of RU and MT.

Figure 12:
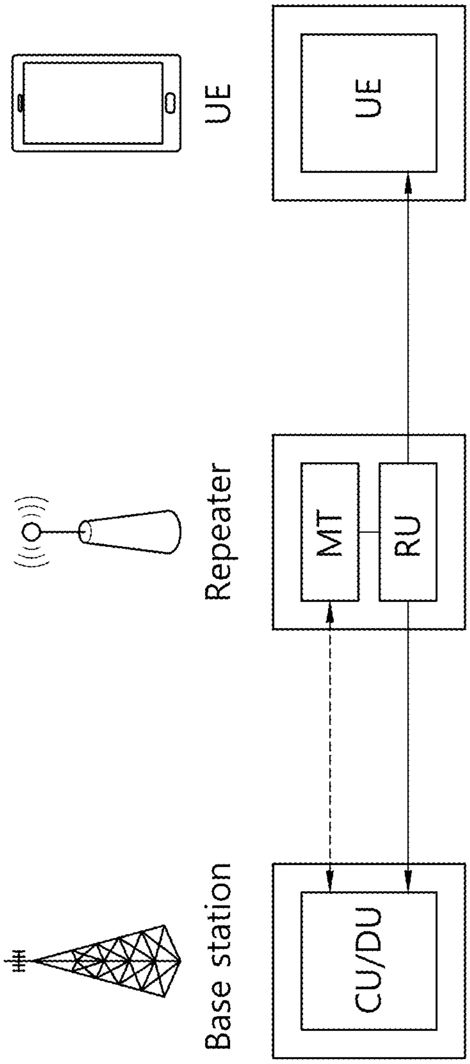
FIG. 12 shows an example of a topology in which the NCR performs transmissions and receptions between the base station and the UE.

FIG. 12 shows an example of a topology in which NCR performs transmission and reception between a base station and a UE.

Referring to FIG. 12, a CU and/or DU exist in the base station, and the NCR may be connected to the base station. NCR may be composed of MT and RU.

The RU may consist of only the RF layer. The RU can receive signals transmitted by the base station at the RF layer and forward them to the UE, and can receive signals transmitted by the UE at the RF layer and forward them to the base station.

RU only relays signals between the base station and the UE, but does not generate signals/channels itself and transmit them to the base station/UE or receive signals/channels from the base station/UE and detect them.

In order to forward the received signal, the RU may consider adjusting the transmit/receive beam direction, DL/UL direction, ON/OFF status, transmit (Tx) power, etc. at the RF end. However, the operation of the RU cannot be determined by the NCR itself, but can be controlled entirely by the base station.

The MT can include an RF layer and L1, L2, and/or L3 layers. For example, the MT may comprise an RF layer and an L1 layer or an L1/L2 layer alone. Alternatively, the MT may comprise an RF layer and L1/L2/L3 layers.

The MT may detect/receive signals/channels transmitted by the base station, and the MT may generate and transmit signals/channels to the base station. In addition, the MT may receive from the base station information necessary to control the operation of the RU (i.e., side control information). The MT does not perform any transmission or reception with the UE.

Figure 13:
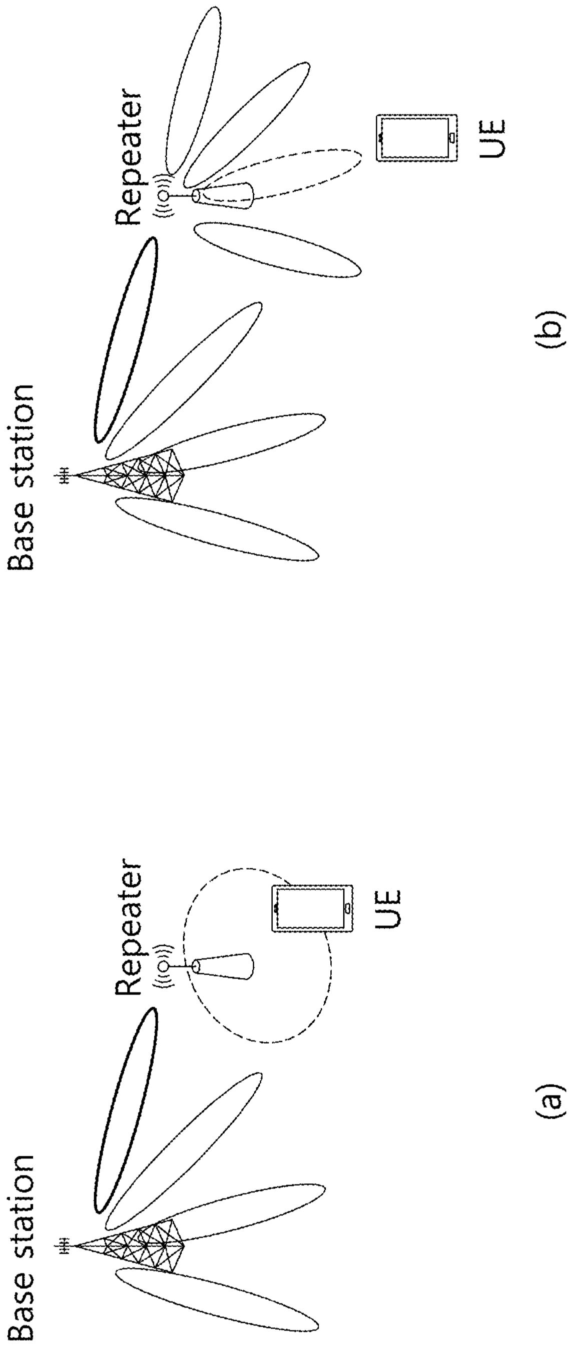
FIG. 13 is a diagram comparing the operation of NCR and an existing RF repeater.

FIG. 13 shows a diagram comparing the operation of NCR and a conventional RF repeater.

Referring to (a) of FIG. 13, in the case of the conventional RF repeater, beamforming was performed applying omni-direction or fixed direction. On the other hand, in NCR, beamforming gain can be obtained by adaptively adjusting the Tx/Rx beam direction of the NCR according to the location of the UE and the channel situation of the UE, as shown in (b) of FIG. 13.

In conventional RF repeaters, it does not distinguish between DL/UL directions in the TDD system and always performs simultaneous transmissions and receptions in both DL and UL directions. Or it only applies fixed TDD configurations to switch between DL and UL directions in a fixed time pattern. On the other hand, in NCR, it is allowed the NCR to perform DL/UL switching by taking into account the TDD configurations. This enables adaptive DL/UL operation and reduces power waste and interference caused by forwarding unnecessary signals.

Conventional RF repeaters always amplify the power of the signal they receive, regardless of whether the base station and UE are transmitting a signal or not. This unnecessarily wastes power and increases interference to the surrounding area. In the case of NCR, it is possible to perform ON/OFF operation to avoid unnecessary signal transmission by turning off the RU when there is no signal to transmit to the base station/UE.

In the case of conventional RF repeaters, the power of the received signal is amplified and transmitted in a fixed ratio. In the case of NCR, the effect of interference on the surrounding area can be reduced by reducing the transmission power of the NCR when transmitting signals with unnecessarily high power, and increasing the transmission power of the NCR when transmitting signals with low power to ensure that the signal is reliably delivered to the receiver.

In the case of conventional RF repeaters, the DL/UL slot boundaries are not known. However, in the case of NCR, the NCR needs to know the transmit and receive boundaries of DLs and ULs in order to adaptively adjust beamforming, ON/OFF, DL/UL direction, Tx power, etc. as described above. This allows the operation of the RU to be adapted differently for each unit of time (e.g., slot/symbol).

Figure 14:
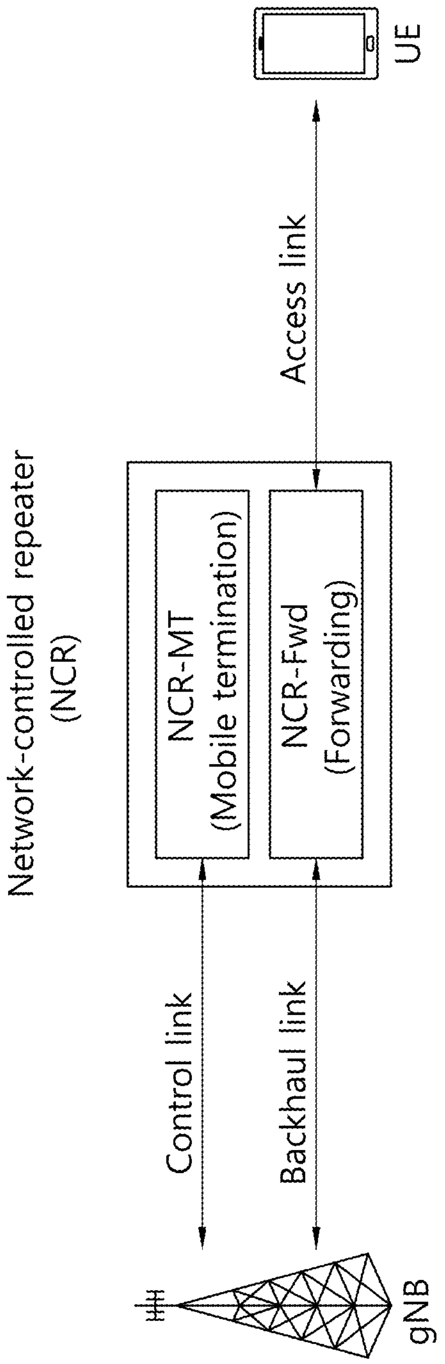
FIG. 14 shows an example of a link between a base station, NCR, and UE.

FIG. 14 illustrates a link between a base station, an NCR, and a UE.

Referring to FIG. 14, NCR may include NCR-MT and NCR-Fwd.

NCR-MT can be defined as a functional entity that communicates with a base station (gNB) over a control link (C-link) to enable information exchange (e.g. side control information). The C-link can be based on the NR Uu interface.

Side control information may be at least information for NCR-Fwd control.

The NCR-Fwd can be defined as a functional entity that performs the amplification and forwarding of UL/DL RF signals between the base station and the UE (terminal) over the backhaul link and the access link. The operation of the NCR-Fwd is controlled by the side control information received from the base station.

Hereinafter, for convenience, NCR-Fwd may be referred to as RU, and NCR-MT may be referred to simply as MT.

Although the contents of this disclosure are described assuming operation in an NCR, the contents of this disclosure may also be applied to non-NCR devices.

Based on this discussion, the present disclosure proposes a method for an MT to receive side control information of an RU from a base station when an NCR performs multi-carrier operation.

The contents of this disclosure are described assuming operation in an NCR. However, the contents of this disclosure may also be applied to devices other than NCR. In particular, the contents of the present disclosure can be applied to the operation of RIS. For this purpose, the NCR mentioned in the present disclosure can be replaced with RIS and extended/interpreted. In this case, the RU plays the role of forwarding signals from the base station to the UE and forwarding signals from the UE to the base station in the RIS, and the MT can play the role of receiving side control information from the base station to control the signal transmission of the RU.

In the present disclosure, the term "network" may be interpreted as being replaced with a base station or a CU/DU. In addition, the term "base station" may be interpreted as being replaced with a network, a CU, or a DU.

In NCR, in order to forward the signal received by the RU, it may be considered to adjust the transmit/receive beam direction, DL/UL direction, ON/OFF, transmission power, etc. at the RF end. However, the operations of the RU cannot be determined by the NCR on its own, but can be controlled entirely by the base station. To this end, the MT may receive from the base station the information necessary to control the operations of the RU (i.e., side control information). This side control information can be conveyed via L1/L2 signalling such as DCI, MAC-CE, etc.

Side control information may include, for example, all or part of the following information.

1) Beamforming information. This can mean information about the Tx/Rx beam direction of the RU. This information may include beam directions for UL Tx to the base station, DL Rx from the base station, DL Tx to the UE, and/or UL Rx from the UE.
2) Timing information to align transmission/reception boundaries of network-controlled repeater. This may mean information for the RU to align Tx/Rx slot or symbol boundaries.
3) Information on UL-DL TDD configuration. This can mean information on the DL/UL direction of the RU.
4) ON-OFF information for efficient interference management and improved energy efficiency. This may mean information about the ON-OFF operation of the RU.
5) Power control information for efficient interference management. This may mean information about the transmission power of the RU. Such information may include UL transmission power to the base station and/or DL transmission power to the UE.

On the other hand, cost efficiency may be an important factor in implementing and maintaining NCR. With this in mind, it can be considered that the MT and RU of the NCR share the same antenna and/or RF and operate intra-band.

Alternatively, to operate the operating frequency resources of the MT and RU more flexibly, it may also be considered that the MT and RU use antennas and/or RF independently of each other. In this case, it may be considered that the MT and RU operate over different subband resources within the same band, or over different carrier frequencies. Alternatively, the antennas and RF may be used independently for reasons such as the MT and RU being physically distant from or not affecting each other.

For cost efficiency, NCR may support only single carrier operation, assuming that MT and RU operate on the same carrier.

Alternatively, in environments where support for high data throughput is required, the NCR can support multi-carrier operation. In such cases, it is necessary to discuss the relationship between the carriers on which the MT and RU operate, and how the MT/RU operate in multi-carrier.

Within an NCR, the RU may operate on multiple carriers, in which case it is necessary to distinguish which side control information the MT receives is for the RU operating on which carrier. In addition, if the MT receives side control information for the RU operating on multiple carriers, it is necessary to define how the side control information is distinguished and received.

This disclosure proposes a method for an MT to receive side control information for an RU from a base station when the NCR performs multi-carrier operation.

In addition, the present disclosure proposes a relationship between an operating carrier resource of an MT and an operating carrier of an RU and a method for an MT to receive, from a base station, side control information for an RU operating on multi-carriers, when an NCR performs multi-carrier operation.

When NCR operates on a single carrier, MT and RU can operate using frequency resources within that single carrier. At this time, the operating frequency resources of the MT and the operating frequency resources of the RU may overlap or non-overlap. That is, the operating frequency resources of the MT and the operating frequency resources of the RU may or may not overlap with each other.

When NCR operates on multiple carriers, MT and/or RU may operate across multiple carriers.

At this time, for NCR to operate in multi-carrier, MT and RU can operate on each of the component carriers (CCs) on which NCR operates. For example, if NCR operates on four CCs, MT and RU can operate on each CC.

Figure 15:
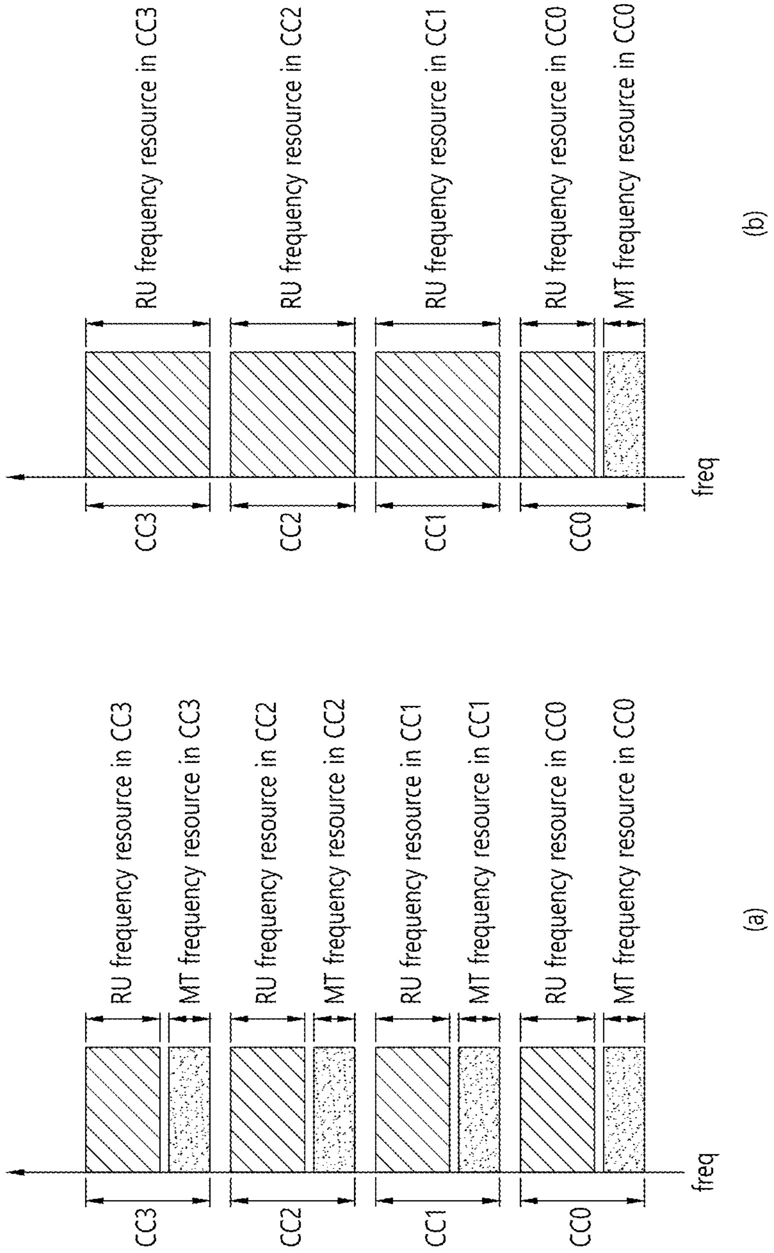
FIG. 15 shows an example of NCR operating in a multi-carrier environment.

FIG. 15 shows an example of NCR operating in a multi-carrier environment.

Referring to (a) of FIG. 15, when NCR operates in four CCs, CC0, CC1, CC2, and CC3, MT and RU operate (can operate) in each of all CCs.

In contrast, MT and/or RU may operate on only some of the component carriers (CCs) on which the NCR operates. For example, MT may operate on only one CC and RU may operate on all carriers. Referring to (b) of FIG. 15, when the NCR operates on four CCs, CC0, CC1, CC2, and CC3, the MT operates on CC0 only, but the RU operates (may operate) on all four CCs.

When both MT and RU are operating in a given CC, the operating frequency resources of the MT and RU may or may not overlap.

<Method for Determining a Serving Cell Receiving Side Control Information in a Multi-Carrier Environment>

If the NCR is operating on a single carrier, the MT may determine that it receives side control information from the base station for the operation of the RU in the serving cell in which the MT operates. In other words, if the MT receives side control information from a serving cell, it may determine that the information applies to the RU operating within the same serving cell.

On the other hand, when NCR operates on multi-carrier, MT can receive side control information for RU as follows.

1.1. A Method in which MT Receives Only Side Control Information for a Specific Serving Cell from the Specific Serving Cell.

The MT may determine that it receives side control information for RU operation on a specific serving cell/CC through the specific serving cell/CC. That is, when the MT receives side control information from a serving cell, it can determine that this is information applicable for RU operation in the serving cell (component carrier). That is, the MT receives side control information for RU operation in CC #n from CC #n.

1.2. A Method in which MT Receives Side Control Information for the Same or Different RU Operating Carrier/Frequency Resources in a Specific Serving Cell.

MT can receive side control information for RU operation on a specific single serving cell/CC where the NCR operates through a specific serving cell/CC. That is, when the MT receives side control information from the serving cell, it can determine that this is information applicable for RU operation in a specific serving cell/CC. For this purpose, MT can receive side control information for RU operation in CC #n from CC #m. At this time, n and m can be the same or different.

In some embodiments, the side control information received by the MT for a specific serving cell/CC may be information about one of the serving cells/CCs existing within the same cell group (CG) as the specific serving cell/CC. That is, the MT can receive side control information for one serving cell/CC belonging to the same CG as a specific serving cell/CC from the specific serving cell/CC.

Depending on the embodiment, the serving cell/CC from which the MT can receive side control information for other serving cells/CCs may be limited to sPCell (special cell. This may mean a primary cell in MCG and a PScell in SCG). In this case, the MT can receive side control information for its serving cell/CC or for other serving cells/CCs within the same CG in the sPCell. However, in the remaining SCells, MT can receive side control information for corresponding serving cell/CC.

For this operation, in a specific serving cell/CC, the MT should know for which serving cell/CC the side control information is received. For this purpose, the MT may receive from the base station the serving cell/CC information to which the side control information applies, per serving cell/CC where MT is operating. Alternatively, information about a serving cell/CC where the side control information for the corresponding serving cell/CC is transmitted can be set for each serving cell/CC. For example, the following information can be set.

Alt 1. The cell ID (i.e. PCID) to which the side control information received from the serving cell/CC is applied can be set for each serving cell/CC on which MT operates.

Alternatively, a cell ID (i.e., PCID) can be set for each serving cell/CC to which side control information for that serving cell/CC is transmitted. However, the same cell ID (i.e., PCID) cannot be set for different serving cells/CCs.

When the MT is set (provided) with the cell ID to which the side control information received from the serving cell/CC applies, the MT may determine that the side control information received from that serving cell/CC applies to the RU forwarding signals from the cell having that cell ID.

Alt 2. For each serving cell/CC in which the MT operates, the serving cell index (i.e. ServCellIndex) to which the side control information received from that serving cell/CC is applied can be set.

Alternatively, a serving cell index (i.e., ServCellIndex) for each serving cell/CC to which side control information for that serving cell/CC is transmitted can be set.

The Information Element (IE) ServCellIndex is related with a short ID used to uniquely identify a serving cell (i.e., PCell, PSCell, or SCell) in a group of cells. A value of 0 applies to PCell, whereas a previously allocated SCellIndex applies to SCell.

That is, in the case of PCell, ServCellIndex is 0, and in the case of SCells, the SCellIndex set through SCellConfig when the SCell is set as shown below can mean ServCellIndex.

Table 5 below shows an example of SCellConfig.

TABLE 5

```
SCellConfig ::=                       SEQUENCE {
  sCellIndex                            SCellIndex,
  sCellConfigCommon                            ServingCellConfigCommon
OPTIONAL,   -- Cond SCellAdd
  sCellConfigDedicated                          ServingCellConfig
OPTIONAL,   -- Cond SCellAddMod
  ...,
  [[
  smtc                                           SSB-MTC
OPTIONAL    -- Need S
```

TABLE 5-continued

```
  ]],
  [[
  sCellState-r16                        ENUMERATED {activated}
OPTIONAL,   -- Cond SCellAddSync
  secondary DRX-GroupConfig-r16          ENUMERATED {true}
OPTIONAL     -- Cond DRX-Config2
  ]]}
-- TAG-CELLGROUPCONFIG-STOP
-- ASN1STOP
```

When the MT is configured with the serving cell index to which the side control information received from the serving cell/CC applies, the MT may determine that the side control information received from that serving cell/CC applies to the forwarding of signals by the RU on the carrier having that serving cell index.

This configuration information can be set to the MT from the base station via RRC or MAC-CE.

In this case, if the MT is not configured with the serving cell/CC information to which the side control information applies, the side control information received from that serving cell/CC can be assumed to apply for RU operation in the same serving cell/CC.

Alternatively, if the MT is not configured with the serving cell/CC to which the side control information is applied, the side control information received from that serving cell/CC can be assumed to be applied for RU operation in the same sPCell (special cell).

1.3. A Method in which the MT Receives Side Control Information for Multiple RU Operating Carrier/Frequency Resources in a Particular Serving Cell.

An MT may receive side control information for RU operation in one or multiple serving cells/CCs in which its NCR operates through a specific serving cell/CC. In other words, an MT may receive side control information for RU operation in multiple serving cells/CCs through a specific serving cell/CC.

In this case, when the MT receives side control information from the serving cell, it may be side control information for RU operation in a specific one serving cell/CC out of the multiple serving cells/CCs in which the NCR operates.

Alternatively, when the MT receives side control information from the serving cell, it may include side control information for RU operation in one or more of the serving cells/CCs out of the serving cells/CCs in which the NCR operates.

In accordance with embodiments, in a specific serving cell/CC, the MT may receive side control information for one or more serving cells/CCs belonging to the same cell group (CG) as the specific serving cell/CC.

Depending on the embodiment, the serving cell/CC from which the MT may receive side control information for other serving cell/CC(s) may be limited to the sPCell. In this case, in the sPCell, the MT may receive side control information for multiple serving cells/CCs including the sPCell and other serving cell/CC(s) belonging to the same CG. On the other hand, the MT can only receive side control information for its serving cell/CC from the remaining SCells.

Depending on the embodiment, the serving cells/CCs from which the MT may receive side control information may be limited to sPCell. In this case, in the sPCell, the MT can receive side control information for serving cells/CCs belonging to the same CG. On the other hand, in the remaining SCells, the MT does not receive side control information.

For this operation, the MT should know for which serving cell/CC side control information is received in a specific serving cell/CC. To this end, the MT can be configured with information, from the base station, about the serving cells/CCs to which the side control information received on each serving cell/CC on which the MT operates is applied. Alternatively, information about the serving cell/CC(s) on which side control information for the serving cell/CC is transmitted can be set for each serving cell/CC. For this purpose, for example, the following information can be set/provided.

Alt 1. A group of cell IDs (i.e., PCIDs) can be set for each serving cell/CC on which MT operates, to which side control information received from the serving cell/CC is applied. That is, information about serving cells/CCs that receive side control information from a serving cell of a specific MT can be set in the form of a cell ID.

Alternatively, a cell ID (i.e., a PCID) through which side control information on a corresponding serving cell/CC is transmitted may be set for each serving cell/CC. At this time, different serving cells/CCs may be set to the same cell ID (i.e. PCID). That is, information about the serving cell/CC from which the MT receives side control information for the RU to operate in a specific serving cell/CC can be set in the form of a cell ID.

In this case, the MT can determine that the side control information applied to forward the signal in the cell with a specific cell ID is received from the corresponding serving cell/CC. When the MT receives side control information and a cell ID to which the side control information applies from the serving cell/CC, the MT can determine that the side control information is applicable to the RU to forward signals in the cell having the corresponding cell ID.

Alt 2. For each serving cell/CC in which MT operates, a group of 'Serving Cell Index (i.e. ServCellIndex)' can be set to which the side control information received from that serving cell/CC is applied. That is, information about serving cells/CCs that receive side control information from a serving cell of a specific MT can be set in the form of a 'serving cell index'.

Alternatively, for each serving cell/CC, a serving cell index (i.e., ServCellIndex) on which side control information for that serving cell/CC is transmitted can be set. At this time, different serving cells/CCs can be set to the same ServCellIndex. That is, information about the serving cell/CC from which the MT receives side control information for the RU to operate in a specific serving cell/CC can be set in the form of a 'serving cell index'.

In this case, the MT can determine that the side control information applied to the RU to forward the signal on the carrier having the corresponding serving cell index is received from the corresponding serving cell/CC. When a specific MT receives side control information and a serving cell index to which the side control information applies from a serving cell/CC, the MT can determine that the side control information is applicable to the RU for forwarding a signal on a carrier having the serving cell index.

This configuration information can be set from the base station to the MT via RRC or MAC-CE.

At this time, if the MT is not configured with the serving cell/CC information to which the side control information is applied, it can be assumed that the side control information received from the corresponding serving cell/CC is applied for RU operation in the same serving cell/CC.

Alternatively, if the MT is not configured with the serving cell/CC information to which the side control information is applied, it can be assumed that the side control information received from the serving cell/CC is applied for RU operation in the same sPCell (special cell).

1.4.

In NCR, NCR-MT and NCR-Fwd can perform in-band operation. However, if the base station is performing multicarrier operation, it is natural to assume that NCR-fwd will also operate based on a multicarrier.

To support the NCR operating with multiple carriers, but also to support in-band operation between NCR-MT and NCR-Fwd, it is desirable that at least one NCR-MT carrier exists within each frequency band in which NCR-Fwd operates.

Figure 16:
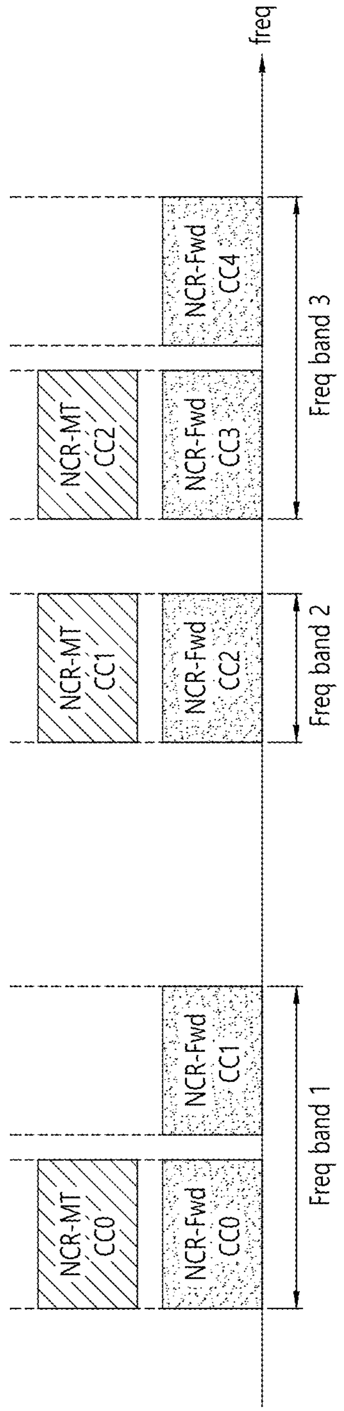
FIG. 16 illustrates a case where NCR-Fwd performs forwarding operations in multiple frequency bands, and there is at least one carrier within each frequency band on which NCR-MT operates.

FIG. 16 illustrates a case where NCR-Fwd performs forwarding operations in multiple frequency bands, examples are provided where there is at least one carrier on which NCR-MT operates within each frequency band.

Referring to FIG. 16, for example, when the NCR-Fwd performs forwarding operations over a plurality of frequency bands (i.e., frequency band 1, frequency band 2, and frequency band 3), it may be assumed that, there is at least one carrier on which the NCR-MT operates within each frequency band. To this end, within each frequency band where NCR-Fwd operates, there is at least one serving cell c of NCR-MT. That is, within each frequency band where NCR-Fwd operates, there is at least one component carrier on which NCR-MT operates.

In this case, the operation of NCR-Fwd within each frequency band can operate in association/relation with the NCR-MT carrier existing in the same frequency band. In other words, when there are multiple NCR-Fwd carriers in a specific frequency band, when referring to the TCI states, Tx/Rx timing, TDD settings, etc. applied to the NCR-MT for the operation of NCR-Fwd on those carriers, it can be determined based on the settings on the NCR-MT carriers that exist in the same frequency band.

Meanwhile, it is necessary to consider whether the side control information for the operation of NCR-Fwd in a specific frequency band can be differently indicated for each carrier on which NCR-Fwd operates within the same frequency band or whether it can be applied commonly.

When NCR-Fwd operates on multiple carriers, the receiving UE of the signals forwarded and transmitted on each carrier may be different. Additionally, the presence or absence of signals/channels transmitted on each carrier may differ. Considering this, it may be necessary to perform forwarding by independently applying beam information and ON-OFF information for each carrier. In other words, side control information applied to a specific NCR-Fwd's carrier can be indicated over an NCR-MT carrier that exists within the same frequency band as the NCR-Fwd's carrier. However, supporting these behaviors may increase implementation complexity.

When NCR-MT receives side control information from a specific serving cell c, the side control information can be commonly applied to the operating carrier(s) of NCR-Fwd existing in the same frequency band. That is, even if NCR-Fwd operates as a multi-carrier within the same frequency band, side control information can be commonly applied to carriers of NCR-Fwd existing within the same frequency band. In some embodiments, side control information applied to a frequency band in which NCR-Fwd operates may be indicated via an NCR-MT carrier existing in the same frequency band.

<RU Operation Through Intra-Carrier Resources>

As described above, RU operates using different carrier resources within an NCR, and RU operations on each carrier can be performed independently by independent side control information.

Meanwhile, RU can perform operations using independent frequency resources within an intra-carrier. RU operations on these independent frequency resources can be performed simultaneously, i.e., RU in the NCR can operate simultaneously using independent frequency resources within the intra-carrier (for the same cell).

At this time, the frequency resources on which RU operates within NCR can be as follows.

Alt 1. RU can operate using different subband resources within the same carrier. At this time, the different subbands on which the RU operates may be composed of overlapping or non-overlapping frequency resources. The subband resources on which each RU operates may be set by implementation or may be set independently by the base station.

Alt 2. RU can operate using different BWP (bandwidth part) resources within the same carrier. At this time, BWP may mean a specific BWP among the BWPs set to the MT. Or, an independent BWP resource may be configured to set the operating frequency resource of the RU.

In this case, it is proposed how the MT receives side control information from the base station for the RU to operate on a specific frequency resource on a specific carrier.

As described above, the carrier/serving cell from which the MT receives side control information for RU operation on a specific carrier/serving cell can be determined. For example, the MT can receive side control information for RU operation on carrier/serving cell #n from carrier/serving cell #m. At this time, when the RU can operate through K independent frequency resources in the corresponding carrier/serving cell #n, the MT can receive side control information for the RU operation in the K frequency resources from the carrier/serving cell #m.

At this time, side control information for RU operation in independent frequency resources of a specific carrier/serving cell can be independently set to the MT for each frequency resource.

Figure 17:
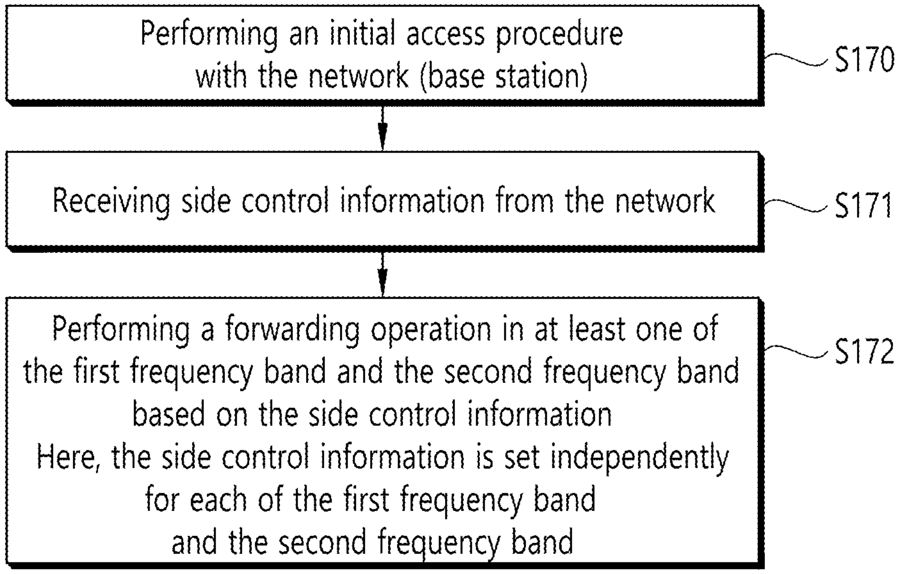
FIG. 17 illustrates a method of operation of an NCR, including a network-controlled repeater (NCR)-mobile terminal (MT) and NCR-Fwd (Forwarding), in a wireless communication system.

FIG. 17 illustrates an operation method of an NCR including a network-controlled repeater (NCR)-MT (mobile terminal) and NCR-Fwd (Forwarding) in a wireless communication system.

Referring to FIG. 17, the NCR performs an initial access procedure with the network (S170). The initial access procedure has been described above with reference to FIG. 10, and for example, the processes from S11 to S16 of FIG. 10 can be performed.

NCR receives side control information from the network (S171).

The side control information may comprise, for example, at least one of: i) beamforming information, which is information about the direction of at least one of the transmit beam and the receive beam of the NCR-Fwd, ii) timing information for aligning the transmit and receive boundaries of the NCR, iii) information about the time division duplex (TDD) settings, iv) ON-OFF information of the NCR-Fwd, or v) power control information.

The NCR performs a forwarding operation in at least one of the first frequency band and the second frequency band based on the side control information, wherein the side control information is set independently for each of the first frequency band and the second frequency band (S172).

In NCR, NCR-MT can receive the side control information from the network and perform the role of controlling the NCR-Fwd.

In NCR, NCR-Fwd can perform at least one of a first forwarding operation that amplifies a first signal received from a UE and forwards it to the network, and a second forwarding operation that amplifies a second signal received from the network and forwards it to the UE.

Depending on the embodiment, the NCR-MT may receive a higher layer message (e.g., RRC message, MAC-CE, etc.) indicating a serving cell index to which the side control information is to be applied.

If the side control information includes a serving cell index, the NCR may determine that the side control information applies to the NCR-Fwd performing a forwarding operation in the frequency band having the serving cell index.

If the side control information does not include the serving cell index, it may be determined that the side control information is applicable to perform the forwarding operation in the frequency band in which the NCR-Fwd received the side control information.

In other words, if the NCR-MT is not configured with the serving cell/CC information to which the side control information is applied, the side control information received from a specific serving cell/CC can be assumed to be applied for NCR-Fwd operation (RU operation) in the specific serving cell/CC.

Depending on the embodiment, if the NCR-MT is not configured with the serving cell/CC information to which the side control information is applied, the side control information received from a specific serving cell/CC can be assumed to be applied for NCR-Fwd operation (RU operation) in a special cell (sPCell).

Depending on the embodiment, the NCR-MT may receive the first side control information for the forwarding operation in the first frequency band of the NCR-Fwd and the second side control information for the forwarding operation in the second frequency band through one frequency band.

Depending on the embodiment, when the NCR-Fwd performs forwarding operations in each of a plurality of frequency bands, each of the plurality of frequency bands may include a frequency band in which the NCR-MT operates.

NCR-Fwd can perform simultaneous forwarding operations using independent frequency resources within a specific frequency band.

The NCR according to the present disclosure can also operate in a multi-carrier environment.

Since the above NCR receives independent side control information for each frequency band/carrier/resource performing forwarding, it can perform different forwarding operations for each frequency band/carrier/resource. This reduces unnecessary power consumption and reduces interference to neighboring UEs/base stations.

In addition, the relationship between the reception of side control information and the application of side control information in a multi-carrier environment can be clarified to avoid ambiguity between the base station and the NCR and between the NCR and the UE.

Figure 18:
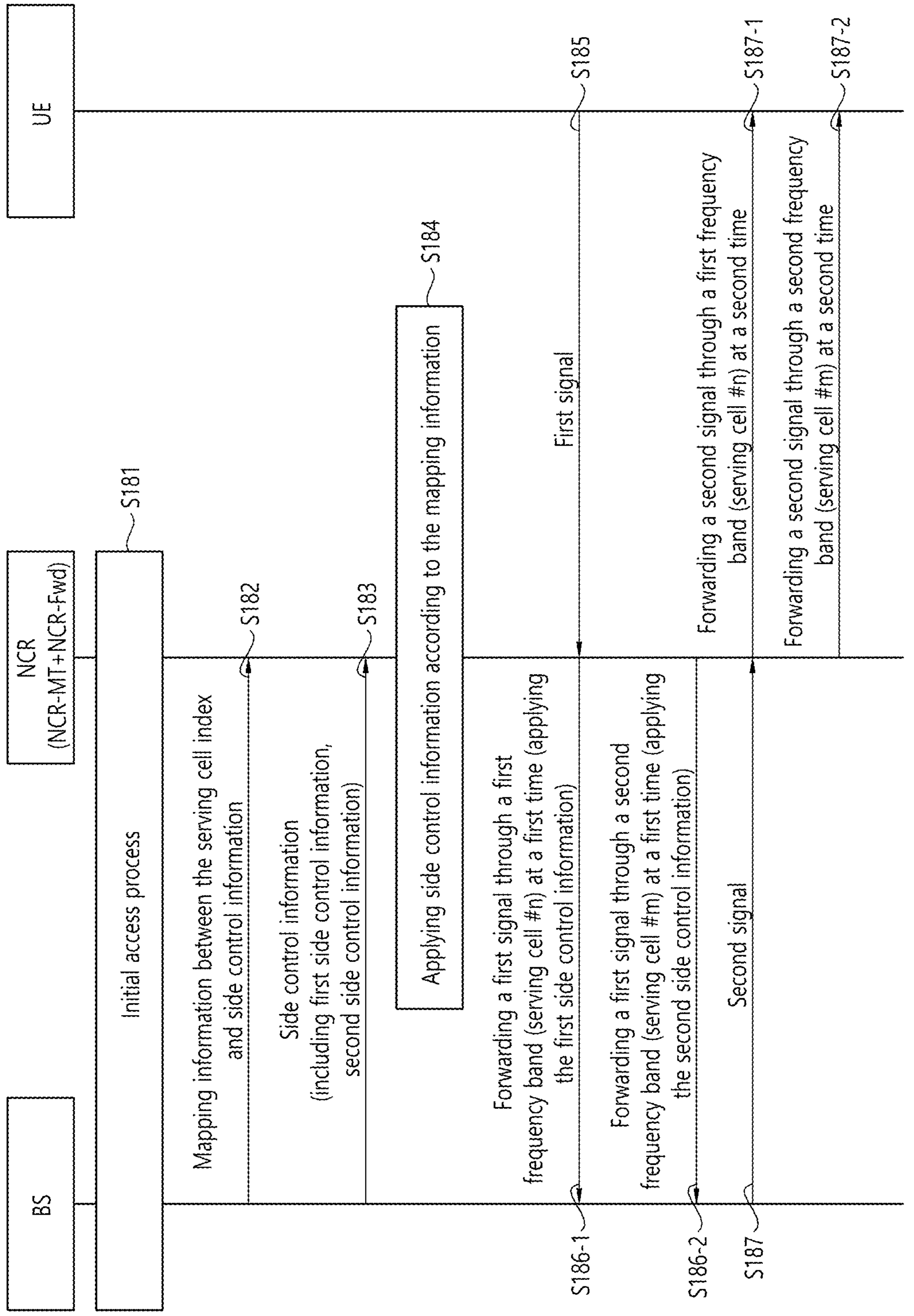
FIG. 18 illustrates a signalling process in a wireless communication system including a base station, an NCR, and a UE.

FIG. 18 illustrates a signaling process in a wireless communication system including a base station, an NCR, and a UE.

Referring to FIG. 18, the base station and NCR perform an initial access process (S181). NCR includes NCR-MT (MT) and NCR-Fwd (RU).

The base station provides mapping information between the serving cell index and side control information to the NCR (S182). The above mapping information may be information indicating a frequency band (serving cell/CC) to which side control information is applied. For example, the mapping information may inform that side control information received in serving cell #1 (serving cell index #1) applies to forwarding operation performed in serving cell #5 (serving cell index #5), and side control information received in serving cell #2 (serving cell index #2) applies to forwarding operation performed in serving cell #6 (serving cell index #6).

Alternatively, the mapping information may indicate in which serving cell the side control information to be applied to the forwarding operation performed in serving cell #n is received. For example, the mapping information may preset in various ways a mapping relationship between the serving cell ID/serving cell index from which the side control information is received and the serving cell ID/serving cell index to which the side control information is applied.

In some embodiments, side control information for forwarding operations performed in different frequency bands may be mapped to be transmitted from one serving cell (e.g., Pcell). In this case, the frequency band (serving cell) to which the side control information applies may be identified based on a serving cell index/serving cell ID included in the side control information.

The base station transmits side control information to the NCR (S183). For example, the side control information may include first side control information, second side control information, and so on. The side control information is set independently for each frequency band in which the NCR-Fwd performs the forwarding operation.

The NCR applies side control information according to the above mapping information (S184).

The NCR receives the first signal from the UE (S185).

The NCR may apply first side control information to transmit a first signal to a base station through a first frequency band (serving cell #n) at a first time (S186-1), and apply second side control information to transmit a first signal to a base station through a second frequency band (serving cell #m) at a first time (S186-2).

The NCR receives a second signal from the base station (S187).

The NCR may apply first side control information to transmit a second signal to the UE through a first frequency band (serving cell #n) at a second time (S187-1), and apply second side control information to transmit a second signal to the UE through a second frequency band (serving cell #m) at a second time (S187-2).

Figure 19:
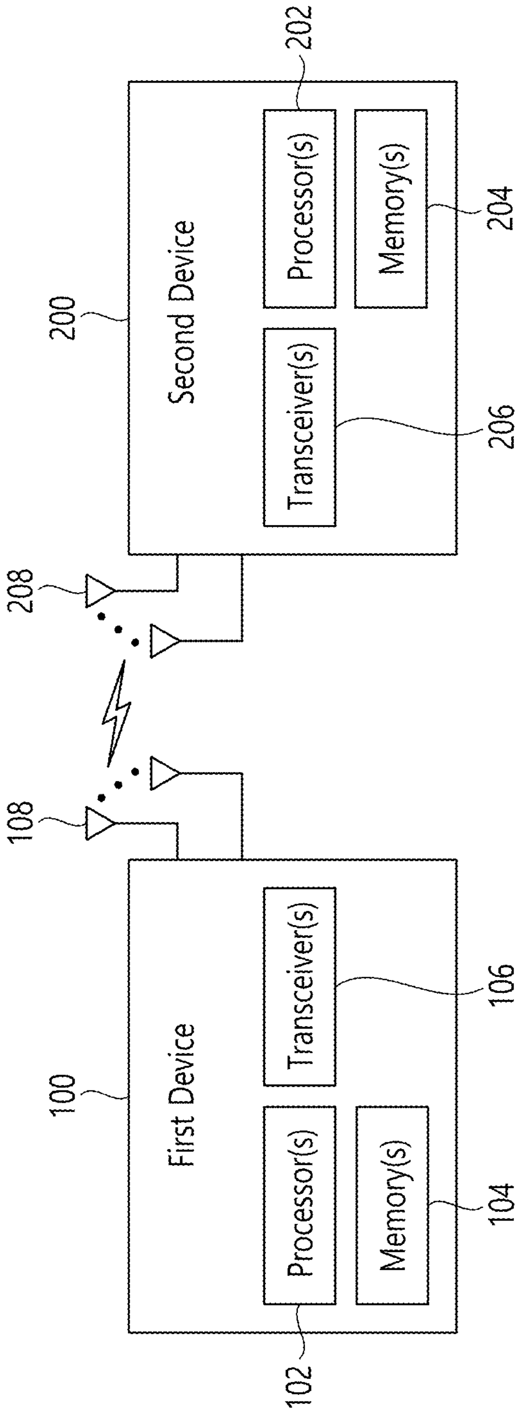
FIG. 19 illustrates a wireless device that can be applied the present specification.

FIG. 19 illustrates a wireless device applicable to the present specification.

Referring to FIG. 19, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The processor 102 performs an initial access procedure with a network, receives side control information from the network and performs a forwarding operation in at least one of a first frequency band and a second frequency band based on the side control information. The side control information is configured independently for each of the first frequency band and the second frequency band.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 206 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

The processor 202 performs an initial access procedure with a network-controlled repeater (NCR) which including a NCR-mobile termination (MT) and NCR-forwarding (Fwd), transmits side control information to the NCR and receives a signal from the NCR or transmits a signal to the NCR in at least one of a first frequency band and a second frequency band based on the side control information. The side control information is configured independently for each of the first frequency band and the second frequency band.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes: performing an initial access procedure with a network, receiving side control information from the network and performing a forwarding operation in at least one of a first frequency band and a second frequency band based on the side control information. The side control information is configured independently for each of the first frequency band and the second frequency band.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
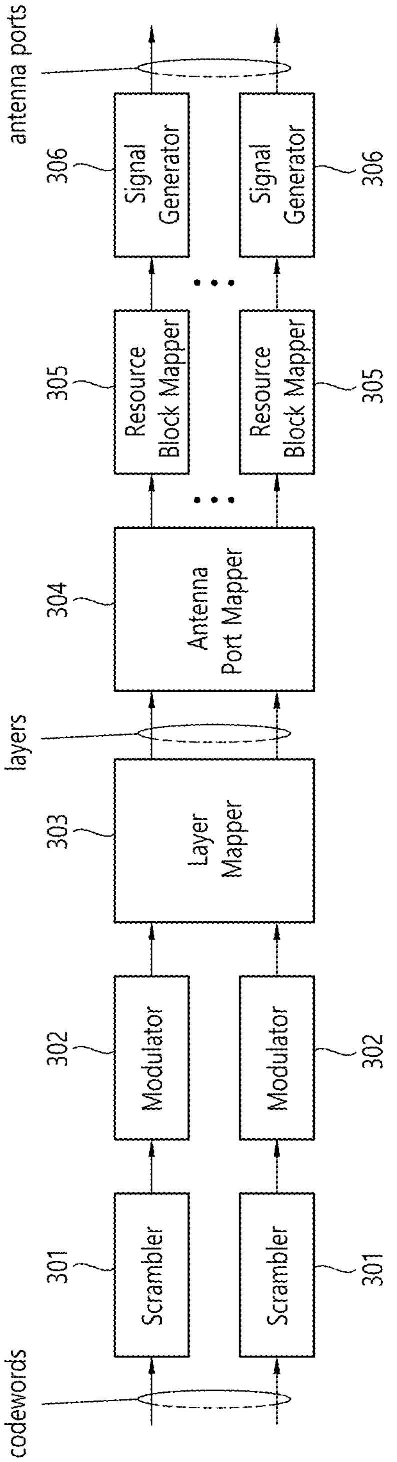
FIG. 20 shows an example of a signal processing module structure.

FIG. 20 shows an example of a structure of a signal processing module. Herein, signal processing may be performed in the processors 102 and 202 of FIG. 19.

Referring to FIG. 20, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
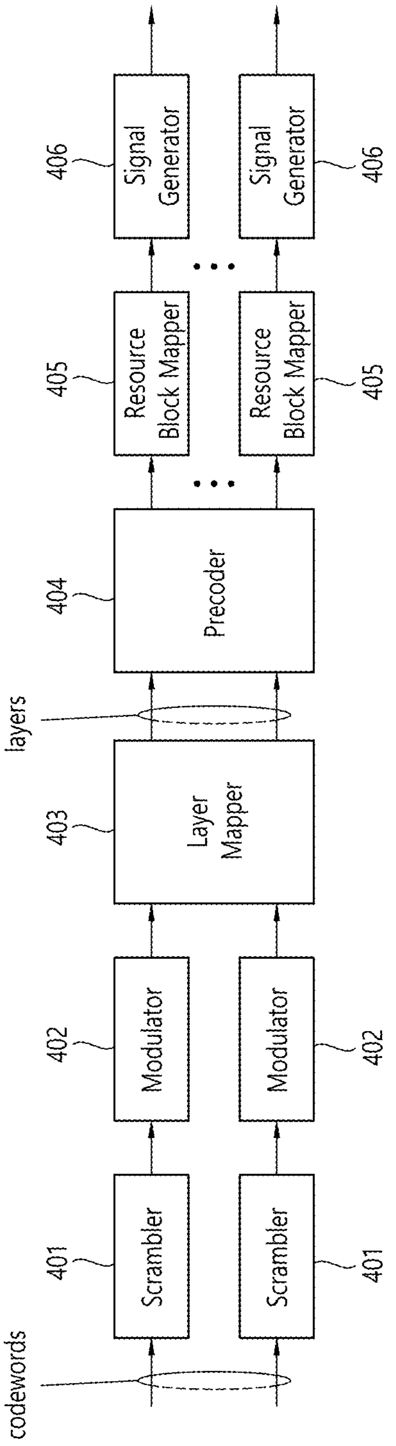
FIG. 21 shows another example of the structure of a signal processing module in a transmission device.

FIG. 21 shows another example of a structure of a signal processing module in a transmitting device. Herein, signal processing may be performed in a processor of a UE/BS, such as the processors 102 and 202 of FIG. 19.

Referring to FIG. 21, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
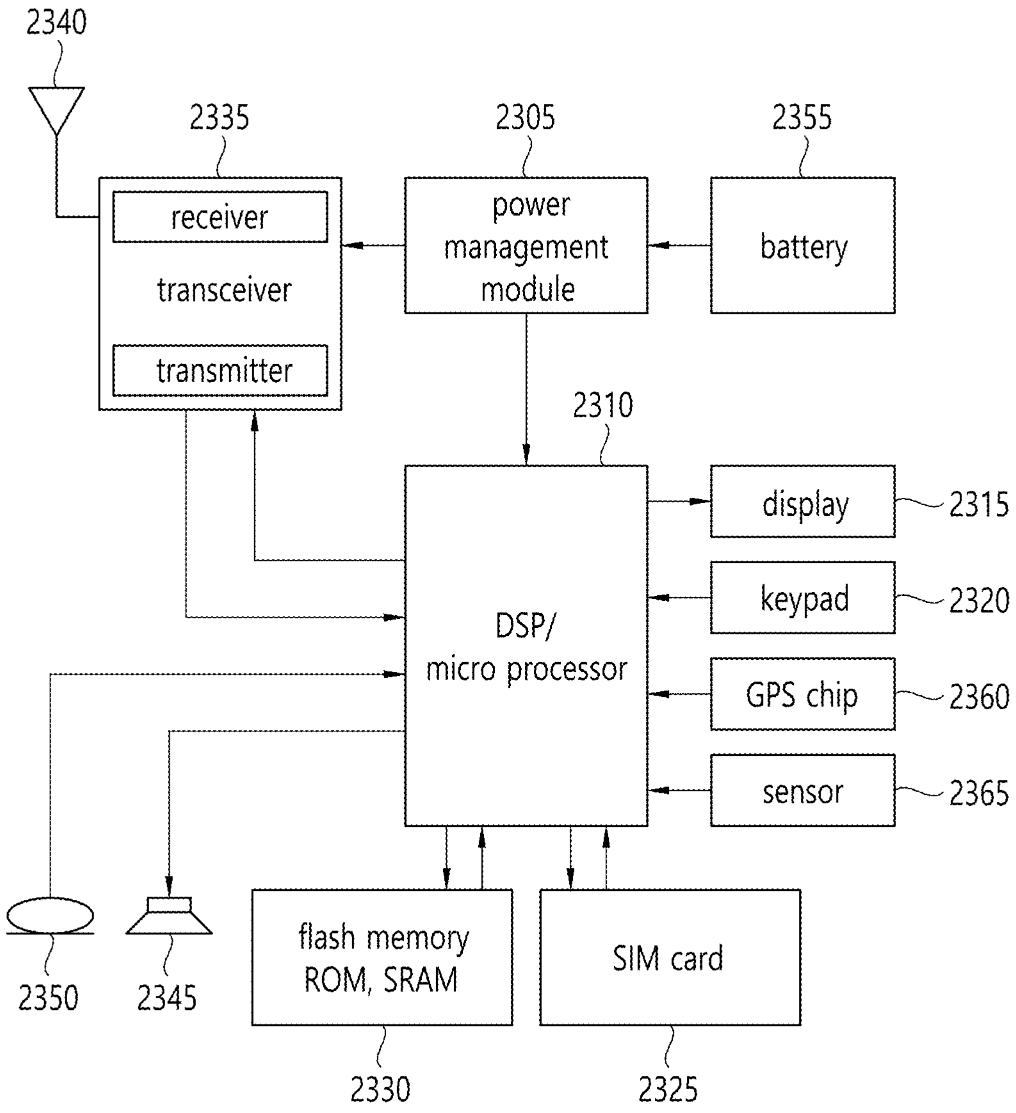
FIG. 22 shows an example of a wireless communication device according to an implementation example of the present disclosure.

FIG. 22 illustrates an example of a wireless communication device according to an implementation example of the present disclosure.

Referring to FIG. 22, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 22 may be the processors 102 and 202 in FIG. 19.

The memory 2330 is connected to the processor 2310 and stores information related to operations of the processor. The memory may be located inside or outside the processor and connected to the processor through various techniques such as wired connection and wireless connection. The memory 2330 in FIG. 22 may be the memories 104 and 204 in FIG. 19.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 33 may be the transceivers 106 and 206 in FIG. 30.

Although not shown in FIG. 22, various components such as a camera and a universal serial bus (USB) port may be additionally included in the UE. For example, the camera may be connected to the processor 2310.

FIG. 22 is an example of implementation with respect to the UE and implementation examples of the present disclosure are not limited thereto. The UE need not essentially include all the components shown in FIG. 22. That is, some of the components, for example, the keypad 2320, the GPS chip 2360, the sensor 2365 and the SIM card 2325 may not be essential components. In this case, they may not be included in the UE.

Figure 23:
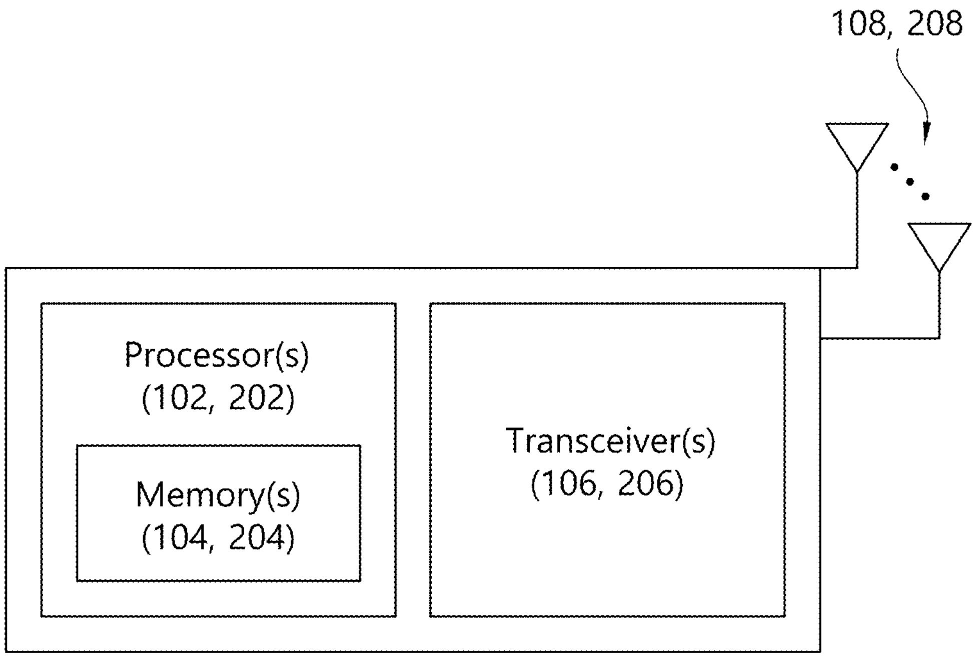
FIG. 23 shows another example of a wireless device.

FIG. 23 shows another example of a wireless device.

Referring to FIG. 23, the wireless device may include one or more processors 102 and 202, one or more memories 104 and 204, one or more transceivers 106 and 206 and one or more antennas 108 and 208.

The example of the wireless device described in FIG. 23 is different from the example of the wireless described in FIG. 19 in that the processors 102 and 202 and the memories 104 and 204 are separated in FIG. 19 whereas the memories 104 and 204 are included in the processors 102 and 202 in the example of FIG. 23. That is, the processor and the memory may constitute one chipset.

Figure 24:
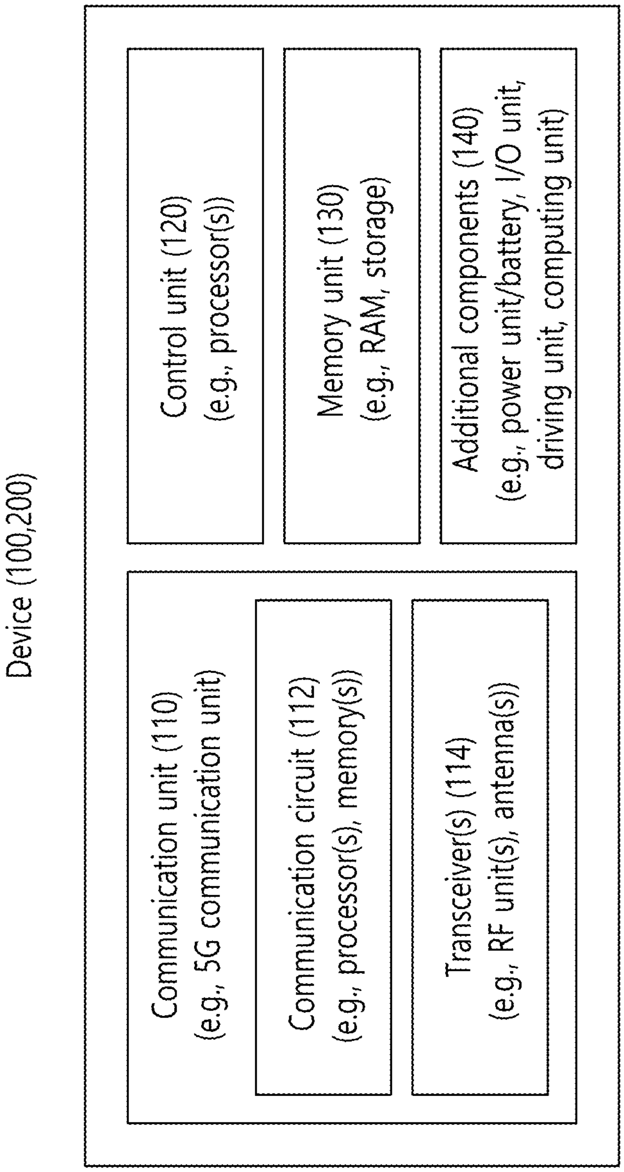
FIG. 24 shows another example of a wireless device applied to the present specification.

FIG. 24 shows another example of a wireless device applied to the present specification. The wireless device may be implemented in various forms according to a use-case/service.

Referring to FIG. 24, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot 100*a* of FIG. 25, the vehicles 100*b*-1, 100*b*-2 of FIG. 25, the XR device 100*c* of FIG. 25, the hand-held device 100*d* of FIG. 25, the home appliance 100*e* of FIG. 25, the IoT device 100*f* of FIG. 25, a digital broadcast UE, a hologram device, a public safety device, an MTC device, a medicine device, a fintech device (or a finance device), a security device, a climate/environment device, the AI server/device 400 of FIG. 25, the BSs 200 of FIG. 25, a network node, etc. The wireless device may be used in a mobile or fixed place according to a use-example/service.

In FIG. 24, various elements, components, units/parts, and/or modules within the wireless devices 100 and 200 may be entirely interconnected through a wired interface, or at least a portion may be wirelessly connected through the communication unit 110. For example, within the wireless devices 100 and 200, the control unit 120 and the communication unit 110 may be connected by wire, and the control unit 120 and the first unit (e.g., 130 and 140) may be connected through the communication unit 110. Additionally, each element, component, unit/part, and/or module within the wireless devices 100 and 200 may further include one or more elements. For example, the control unit 120 may be comprised of one or more processor sets. For example, the control unit 120 may be comprised of a communication control processor, an application processor, an electronic control unit (ECU), a graphics processing processor, and a memory control processor. As another example, the memory unit 130 includes random access memory (RAM), dynamic RAM (DRAM), read only memory (ROM), flash memory, volatile memory, and non-volatile memory, volatile memory) and/or a combination thereof.

Figure 25:
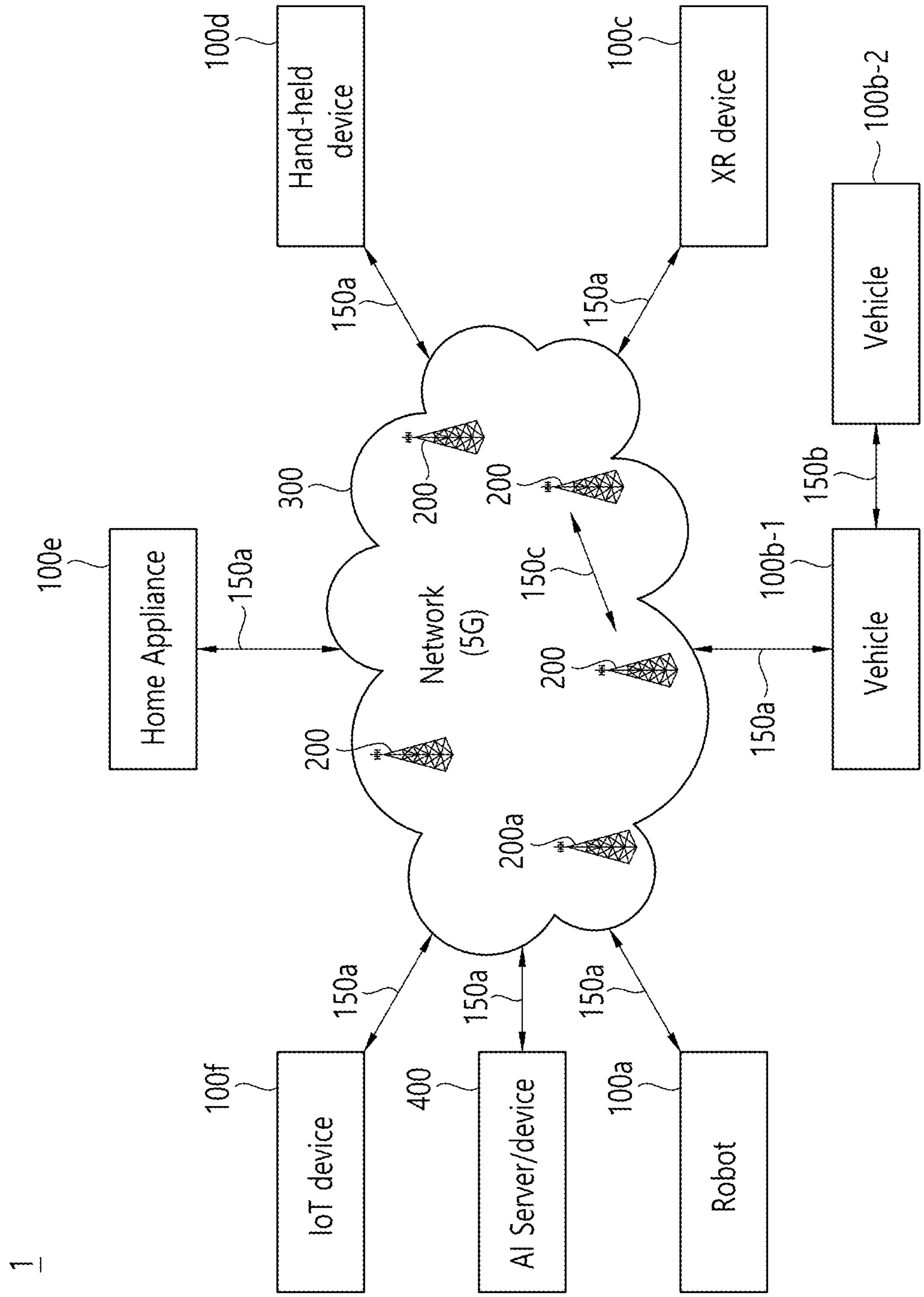
FIG. 25 illustrates the communication system 1 applied to this specification.

FIG. 25 illustrates a communication system 1 applied to the present specification.

Referring to FIG. 25, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 6. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 6

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 7 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 7

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of operating an apparatus including a network-controlled repeater (NCR)-mobile termination (MT) and NCR-forwarding (Fwd) in a wireless communication system, the method comprising:

performing an initial access procedure with a network;

receiving side control information from the network; and performing a forwarding operation in at least one of a first frequency band and a second frequency band based on the side control information, wherein the side control information is configured independently for each of the first frequency band and the second frequency band.

2. The method of claim 1, wherein the NCR-MT receives the side control information from the network to control the NCR-Fwd.

3. The method of claim 1, wherein the NCR-Fwd performs at least one of a first forwarding operation of amplifying a first signal received from the user equipment (UE) and forwarding the first signal to the network and a second forwarding operation of amplifying a second signal received from the network and forwarding the second signal to the UE.

4. The method of claim 1, wherein the side control information comprises at least one of beamforming information which is information about a direction of at least one of a transmit beam and a receive beam of the NCR-Fwd, timing information for aligning transmit and receive boundaries of the apparatus, information about time division duplex (TDD) configuration, ON-OFF information of the NCR-Fwd, or power control information.

5. The method of claim 1, wherein the NCR-MT receives a higher layer message informing at least one of a serving cell index to which the side control information is applied and a serving cell index to which the side control information is received.

6. The method of claim 5, wherein, based on the serving cell index being included in the side control information, the side control information is applied to cause the NCR-Fwd to perform a forwarding operation in a frequency band having the serving cell index.

7. The method of claim 5, wherein, based on the side control information not including a serving cell index, the side control information is applied to perform a forwarding operation in a frequency band in which the NCR-Fwd receives the side control information.

8. The method of claim 1, wherein the NCR-MT receives first side control information for forwarding operation in the first frequency band of the NCR-Fwd and second side control information for forwarding operation in the second frequency band through one frequency band.

9. The method of claim 1, wherein when the NCR-Fwd performs the forwarding operation in each of a plurality of frequency bands, each of the plurality of frequency bands includes a frequency band in which the NCR-MT operates.

10. The method of claim 1, wherein the NCR-Fwd is capable of performing forwarding operations simultaneously using frequency resources independent of each other within a specific frequency band.

11. An apparatus including a network-controlled repeater (NCR)-mobile termination (MT) and NCR-forwarding (Fwd), the apparatus comprising:

at least one transceiver;

at least one memory; and at least one processor operably coupled to the at least one memory and the at least one transceiver, wherein the at least one memory stores instructions that, based on being executed by the at least one processor, cause the at least one processor to perform operations comprising:

performing an initial access procedure with a network;

receiving side control information from the network; and performing a forwarding operation in at least one of a first frequency band and a second frequency band based on the side control information, wherein the side control information is configured independently for each of the first frequency band and the second frequency band.

12. The apparatus of claim 11, wherein the NCR-MT receives the side control information from the network to control the NCR-Fwd.

13. The apparatus of claim 11, wherein the NCR-Fwd performs at least one of a first forwarding operation of amplifying a first signal received from the user equipment (UE) and forwarding the first signal to the network and a second forwarding operation of amplifying a second signal received from the network and forwarding the second signal to the UE.

14. The apparatus of claim 11, wherein the side control information comprises at least one of beamforming information which is information about a direction of at least one of a transmit beam and a receive beam of the NCR-Fwd, timing information for aligning transmit and receive boundaries of the apparatus, information about time division duplex (TDD) configuration, ON-OFF information of the NCR-Fwd, or power control information.

15. The apparatus of claim 11, wherein the NCR-MT receives a higher layer message informing at least one of a serving cell index to which the side control information is applied and a serving cell index to which the side control information is received.

16. The apparatus of claim 15, wherein, based on the serving cell index being included in the side control information, the side control information is applied to cause the NCR-Fwd to perform a forwarding operation in a frequency band having the serving cell index.

17. The apparatus of claim 15, wherein, based on the side control information not including a serving cell index, the side control information is applied to perform a forwarding operation in a frequency band in which the NCR-Fwd receives the side control information.

18. The apparatus of claim 11, wherein the NCR-MT receives first side control information for forwarding operation in the first frequency band of the NCR-Fwd and second side control information for forwarding operation in the second frequency band through one frequency band.

19. The apparatus of claim 11, wherein when the NCR-Fwd performs the forwarding operation in each of a plurality of frequency bands, each of the plurality of frequency bands includes a frequency band in which the NCR-MT operates.

20. A method of operating a base station in a wireless communication system, the method comprising:

performing an initial access procedure with a network-controlled repeater (NCR) which including a NCR-mobile termination (MT) and NCR-forwarding (Fwd);

transmitting side control information to the NCR; and receiving a signal from the NCR or transmitting a signal to the NCR in at least one of a first frequency band and a second frequency band based on the side control information, wherein the side control information is configured independently for each of the first frequency band and the second frequency band.

* * * * *